US009829308B2

(12) United States Patent
Stewart et al.

(10) Patent No.: US 9,829,308 B2
(45) Date of Patent: Nov. 28, 2017

(54) SYSTEM AND METHOD FOR MEASURING AND MAPPING A SURFACE RELATIVE TO A REFERENCE

(75) Inventors: Michael Paul Stewart, St. James (AU); Derek Lichti, Calgary (CA); Jochen Franke, Beaconsfield (AU)

(73) Assignee: OUTOTEC PTY LTD, Frenchs Forest, NSW (AU)

( * ) Notice: Subject to any disclaimer, the term of this patent is extended or adjusted under 35 U.S.C. 154(b) by 288 days.

(21) Appl. No.: 11/994,260

(22) PCT Filed: Oct. 20, 2005

(86) PCT No.: PCT/AU2005/001630
§ 371 (c)(1),
(2), (4) Date: Dec. 28, 2007

(87) PCT Pub. No.: WO2007/000010
PCT Pub. Date: Jan. 4, 2007

(65) Prior Publication Data
US 2010/0131234 A1     May 27, 2010

(30) Foreign Application Priority Data
Jun. 28, 2005  (AU) .................. 2005903403

(51) Int. Cl.
G01B 11/06    (2006.01)
B02C 4/32     (2006.01)
G01B 11/24    (2006.01)

(52) U.S. Cl.
CPC ............ *G01B 11/0616* (2013.01); *B02C 4/32* (2013.01); *G01B 11/24* (2013.01)

(58) Field of Classification Search
CPC .................................................. G01B 11/24
USPC ................................................ 702/94; 42/94
See application file for complete search history.

(56) References Cited

U.S. PATENT DOCUMENTS 2,713,609 A   7/1955   Niklason
3,516,343 A   6/1970   Tunney
(Continued)

FOREIGN PATENT DOCUMENTS

EP   0509809 A2   10/1992
EP   0875751 A1   11/1998
(Continued)

OTHER PUBLICATIONS

Dennis, M.: Offer to sale made by M. Dennis of Process Engineering Resources Inc. to L. Furtenbach of Metso Mining and Construction Technology; Dec. 24, 2003; 1 page.*
(Continued)

*Primary Examiner* — Ricky Ngon
(74) *Attorney, Agent, or Firm* — Armstrong Teasdale LLP

(57) ABSTRACT

A method for measuring the displacement of a surface relative to a base reference. The method includes generating point cloud data between a reference point and a surface disposed distally from the reference point to define a three dimensional image of the surface. The method also includes determining the location and direction of key reference parameters of the object defined by the three dimensional image from the point cloud data. The method also includes obtaining base reference data in a prescribed co-ordinate system in respect of a base reference relative to the surface. Further, the method provides for processing the point cloud data and the base reference data, orientating the point cloud data relative to the key reference parameters defined by the base reference data and transforming the point cloud data into a co-ordinate system coinciding with the base reference data.

24 Claims, 24 Drawing Sheets

(56) References Cited

U.S. PATENT DOCUMENTS

| | | | |
|---|---|---|---|
| 3,565,352 | A | 2/1971 | Rea |
| 3,809,607 | A | 5/1974 | Burns et al. |
| 3,960,330 | A | 6/1976 | Henson |
| 4,025,192 | A | 5/1977 | Scholdstrom et al. |
| 4,033,653 | A | 7/1977 | Doring et al. |
| 4,305,415 | A | 12/1981 | Galli |
| 4,406,414 | A | 9/1983 | Segawa |
| 4,814,664 | A | 3/1989 | Rothenbuhler |
| 4,848,681 | A | 7/1989 | Eriksson et al. |
| 4,885,877 | A | 12/1989 | Hunt et al. |
| 5,127,736 | A | 7/1992 | Neiheisel |
| 5,212,738 | A | 5/1993 | Chande et al. |
| 5,431,351 | A | 7/1995 | Lejonklou |
| 5,772,183 | A | 6/1998 | Sears |
| 5,915,132 | A | 6/1999 | Counts, Jr. |
| 6,192,909 | B1 | 2/2001 | Strausser |
| 6,512,518 | B2 * | 1/2003 | Dimsdale ............... 345/427 |
| 6,685,170 | B1 | 2/2004 | Gwynn |
| 6,780,351 | B2 | 8/2004 | Wirth, Jr. |
| 6,858,826 | B2 | 2/2005 | Mueller et al. |
| 6,874,364 | B1 | 4/2005 | Campbell et al. |
| 6,922,252 | B2 | 7/2005 | Harvill et al. |
| 7,789,356 | B1 | 9/2010 | Jones |
| 8,083,982 | B2 | 12/2011 | Kirchhoff et al. |
| 2002/0145607 | A1 | 10/2002 | Dimsdale |
| 2002/0158368 | A1 | 10/2002 | Wirth, Jr. |
| 2003/0071194 | A1 * | 4/2003 | Mueller et al. ........... 250/208.1 |
| 2004/0001620 | A1 | 1/2004 | Moore et al. |
| 2004/0056217 | A1 | 3/2004 | Harvill et al. |
| 2004/0140412 | A1 | 7/2004 | Hendzel et al. |
| 2004/0254758 | A1 | 12/2004 | Chang |
| 2005/0263945 | A1 | 12/2005 | Kirchhoff et al. |
| 2010/0145666 | A1 * | 6/2010 | Adachi et al. ............... 703/1 |
| 2010/0187848 | A1 | 7/2010 | Kapoor |

FOREIGN PATENT DOCUMENTS

| | | |
|---|---|---|
| JP | 58196406 | 11/1983 |
| JP | 2004085541 A | 3/2004 |
| WO | 0138900 A1 | 5/2001 |
| WO | 2003081157 A1 | 10/2003 |
| WO | 03094102 A1 | 11/2003 |
| WO | 2007000010 A1 | 1/2007 |

OTHER PUBLICATIONS

An International Search Report for corresponding International Application No. PCT/AU2005/001630 (3 pages).

R. Sebring et al., "Non-Contact Optical Three Dimensional Liner Metrology", Proc. 28th IEEE International Conference on Plasma Science / 13th IEEE International Pulsed Power Conference, pp. 1414-1417, Jun. 2001 (4 pages).

EPO Search Report for related application PCT/AU2005001630 dated Jan. 17, 2012.

Moller, T.; Email from T. Moller to L.Furtenbach enclosing Mill Liner Wear Inspection by Laser Scanning; Feb. 4, 2014; 2 pages.

Franke, J.; Mill Liner Wear Inspection by Laser Scanning; Curtin University of Technology; Nov. 2004; pp. 1-12.

Moller, T.; Photo taken at 2004 Mine Expo, Kalgoorlie, Australia; Nov. 2004; 1 page.

Rosario, P.P. et al.; Liner Wear and Performance Investigation of Primary Gyratory Crushers; Science Direct; Minerals Engineering 17; Jun. 1, 2004; pp. 1241-1254.

Sebring, R. et al.; Non-Contact Optical Three Dimensional Liner Metrology; Los Alamos National Laboratory; IEEE International Conference on Plasma Science; 13th IEEE Internal Pulsed Power Conference Record; Jun. 1, 2001; 6 pages.

Barratt, D. et al.; International Autogenous and Semiautogenous Grinding Technology 2001; vol. IV of IV; Conference Record from SAG Conference Vancouver 2001; 11 pages.

Dennis, M.; Advancement in Liner Measurement; PERIProFiler; 2003; 6 pages.

Dennis, M.; ProFiler Liner Profile Measurement; SMI Tuscon; Dec. 2003; 14 pages.

Gordon, S. et al.; Application of a High-Resolution, Ground-Based Laser Scanner for Deformation Measurements; 10th FIG Symposium on Deformation Measurements; Orange, CA; Mar. 19-22, 2001; pp. 23-32.

Licti, D.D. et al.; Ground-Based Laser Scanners: Operation, Systems and Application; Geomatica vol. 56, No. 1; 2002; pp. 21-33.

Bae, K. et al.; Automated Registration of Unorganised Point Clouds from Terrestrial Laser Scanners; Conference Paper from XXth ISPRS Congress Technical Commission V; Jul. 12-23, 2004; Istanbul, Turkey; 6 pages.

Leica Geosystems HDS, Inc. Webpage including Press Releases entitled Leica Announces CloudWorx 3.0 for Handling Large Laser Scan Data Sets with CAD and Leica Announces Cyclone 5.1 for New, Ultra-fast Laser Scanner and as Upgradr for Large Base of Cyclone 4.1 Users; 2004; 7 pages.

Jacobs, G.; Extracting Points, Lines, Surfaces, Features & Models from Point Clouds; Professional Surveyor Magazine; Sep. 2004; 6 pages.

Gruen, A. et al.; Least Squares 3D Surface and Curve Matching; ISPRS Journal of Photogrammetry and Remote Sensing, vol. 39, Issue 3; May 2005; pp. 151-174.

* cited by examiner

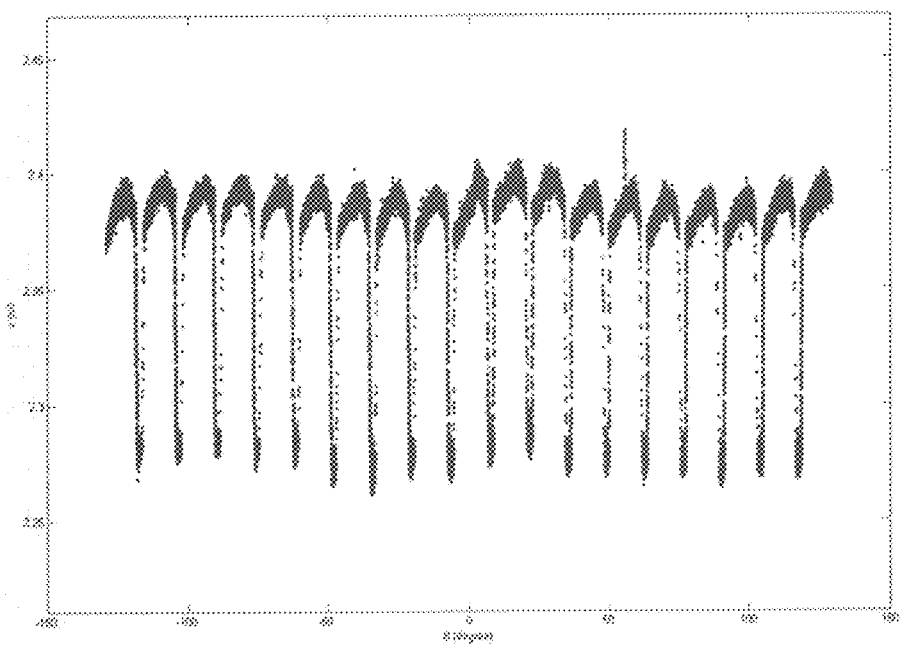
Fig. 14
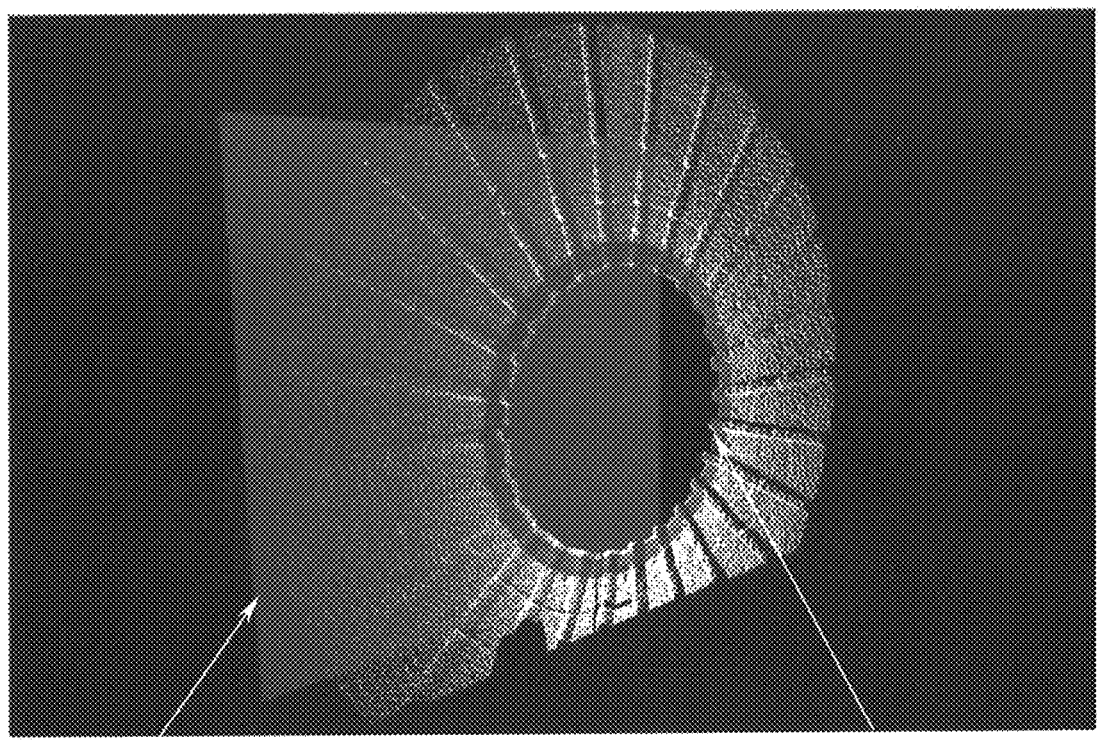
68  Fig. 15  66

APPENDIX

Example Laser Scanning Survey Report Sheet

Job Details

| Site Name | Example | Mill ID | Mill X |
|---|---|---|---|
| Scanner Operator | Example | Client Contact Name | Client X |
| Data Acquisition Date | example date | Time | example time |

| Scan filename | example.txt |
|---|---|

Data Processing Results

| Liner | Belly | Feed | Discharge |
|---|---|---|---|
| Number of Scan Points | 2,000,000 | 900,000 | 120,000 |
| Min Liner Thickness Including Gaps | 0.015 m | 0 m | 0 m |
| Max Liner Thickness | 0.200 m | 0.180 m | 0.200 m |
| Mean Liner Thickness | 0.100 m | 0.080 m | 0.080 m |

| Liner | Belly | Feed | Discharge | Belly last 1m* |
|---|---|---|---|---|
| % Scan Points Below 30 mm Liner Thickness | 0.2 | 3.9 | 10.3 | 3.2 |
| % Scan Points Below 50 mm Liner Thickness | 5.9 | 34.4 | 17.4 | 11.0 |
| % Scan Points Below 80 mm Liner Thickness | 50.4 | 71.4 | 46.4 | 52.3 |
| % Scan Points Below 100 mm Liner Thickness | 58.2 | 74.6 | 81.5 | 64.5 |

* special feature for irregularly wearing rodmills, where subsection of belly liner (e.g. discharge end minus 1m) wears most

Data Acquisition

| Angular Extents Vertical | 320 deg | Angular Extents Horizontal | 360 deg |
|---|---|---|---|
| Scan Resolution | 3 pts/cm$^2$ | Number of Scan Points | 7,000,000 |

| Number of Repeat Scans | 1 | Averaged | Yes | NA | No | NA |
|---|---|---|---|---|---|---|
| Scanner Calibration Date | Example d. | Calibration Precision | 3 mm | | | |

| Time Elapsed Between Shutdown and Scanning | 24 h | | |
|---|---|---|---|
| Mill Internal Temperature During Scanning | 30 deg | | |
| Mill External Temperature During Scanning | 30 deg | | |
| Liner Surface Cover | Clean | X | Muddy | | Very Muddy | |

Comments

Fig. 24A

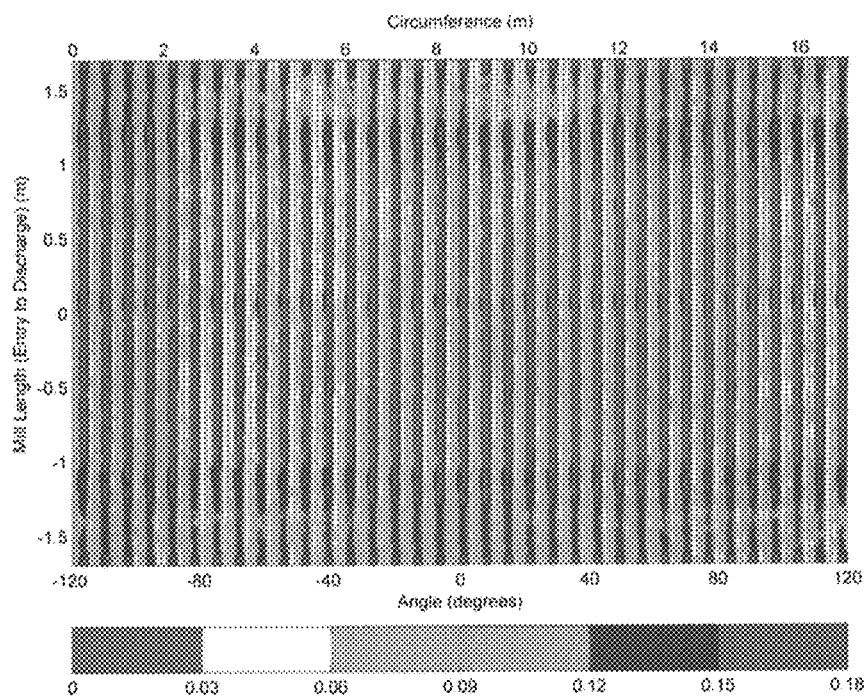
*1. Contour plot of liner thickness (m) at belly*
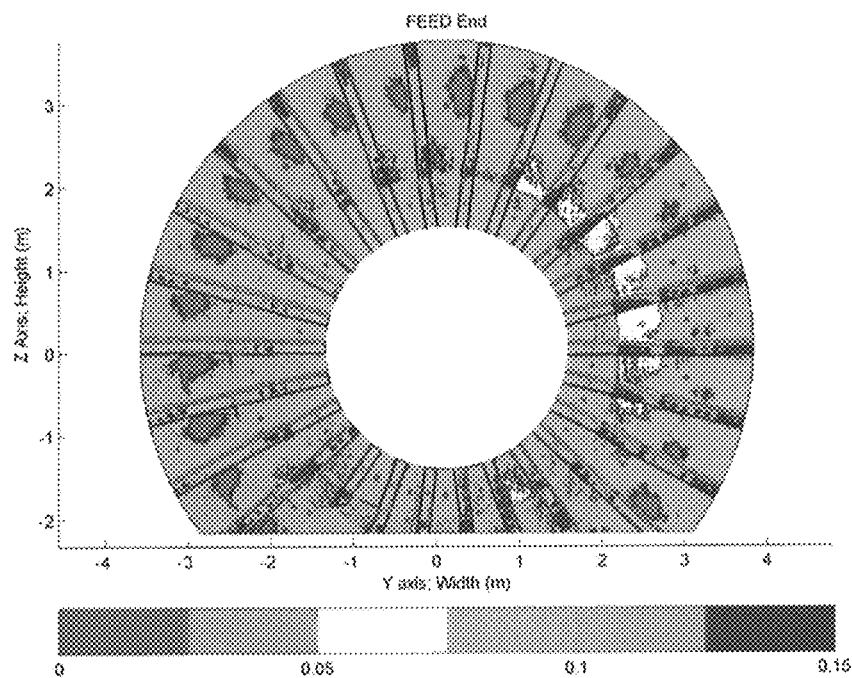
*2. Contour plot of liner thickness (m) at feed end*
Fig. 24B

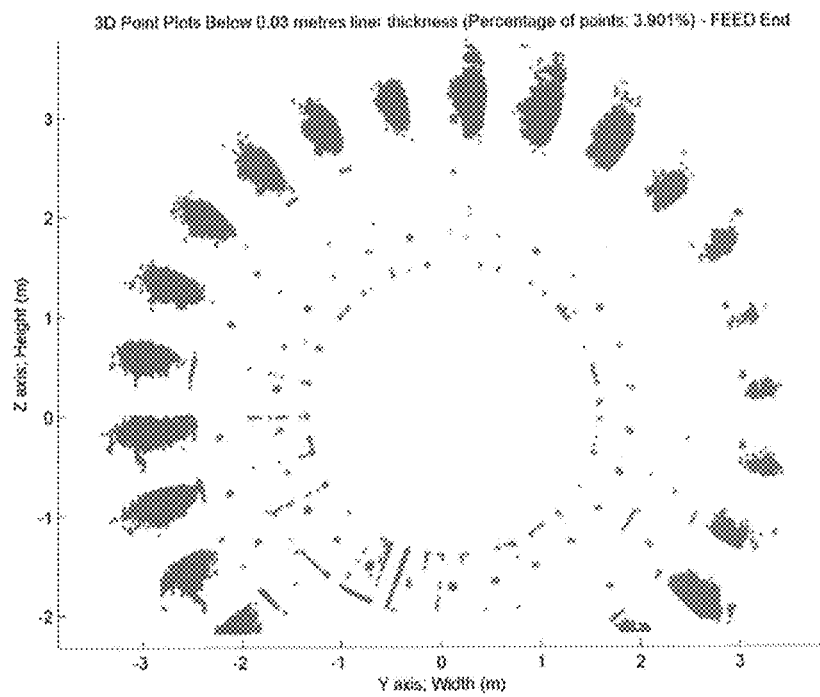
*3. Feed end mill liner surface plot showing point locations with less than 30 mm liner thickness*
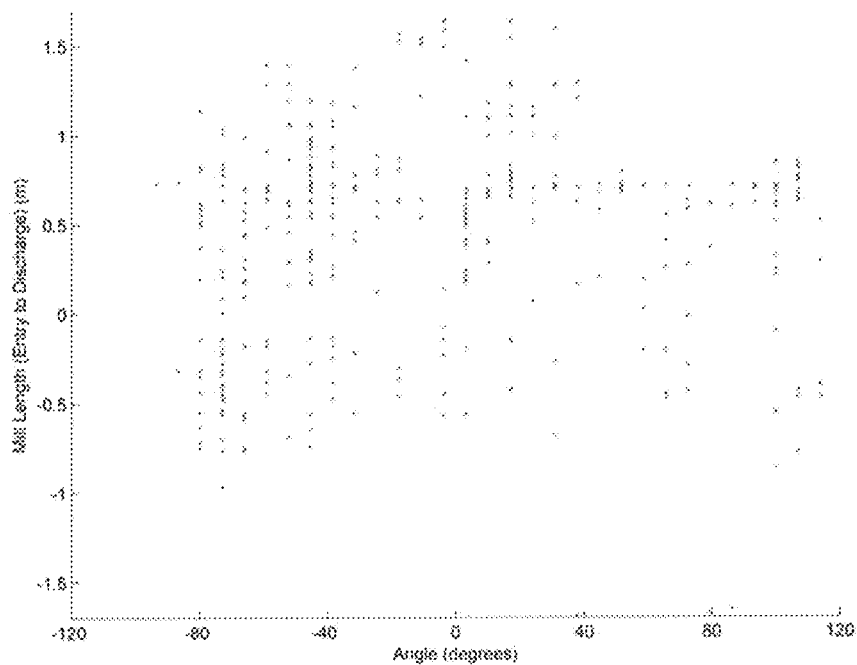
*4. Unwrapped shell / belly mill liner surface plot showing point locations with less than 30 mm liner thickness*
Fig. 24C

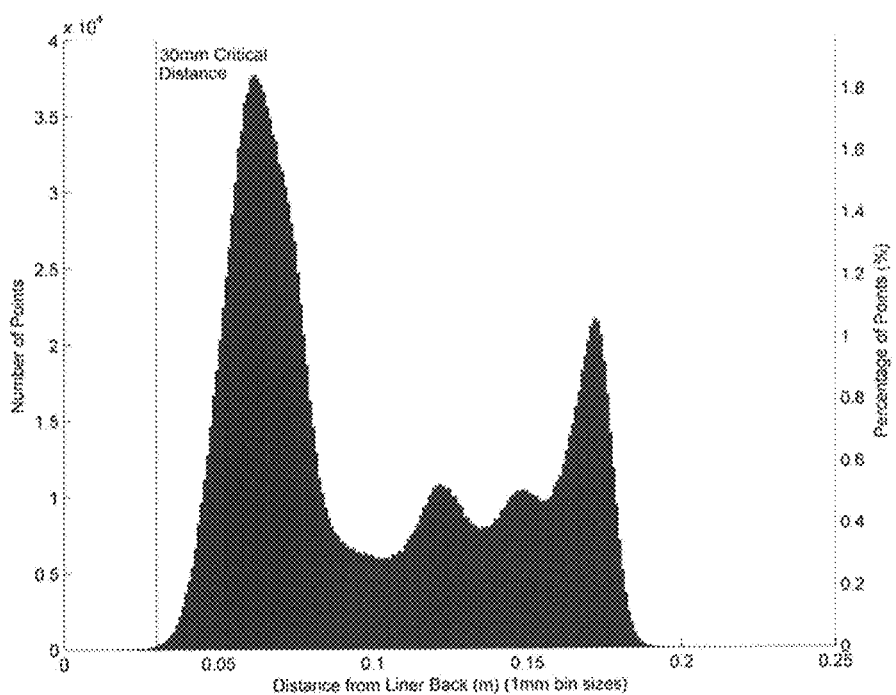
*5. Histogram of liner thickness for all scan points*
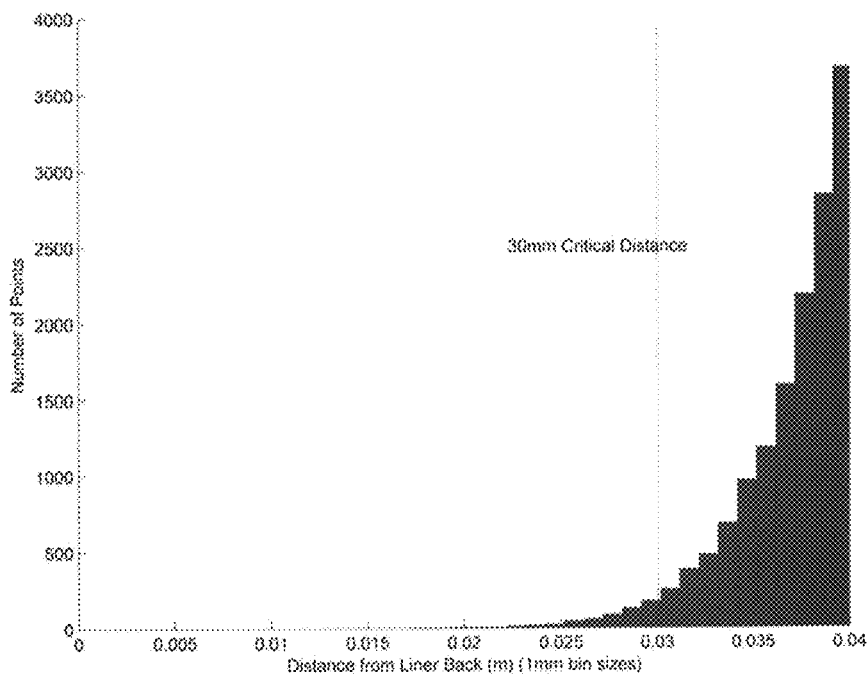
*6. Detailed view of histogram of liner thickness (0 to 40mm)*
Fig. 24D

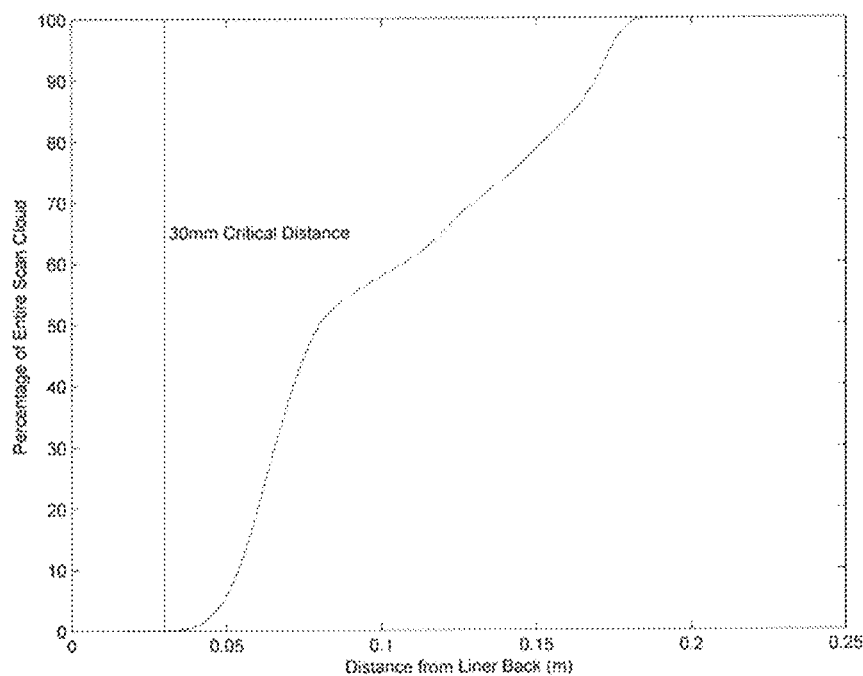
*7. Cumulative histogram of liner thickness for all scan points*
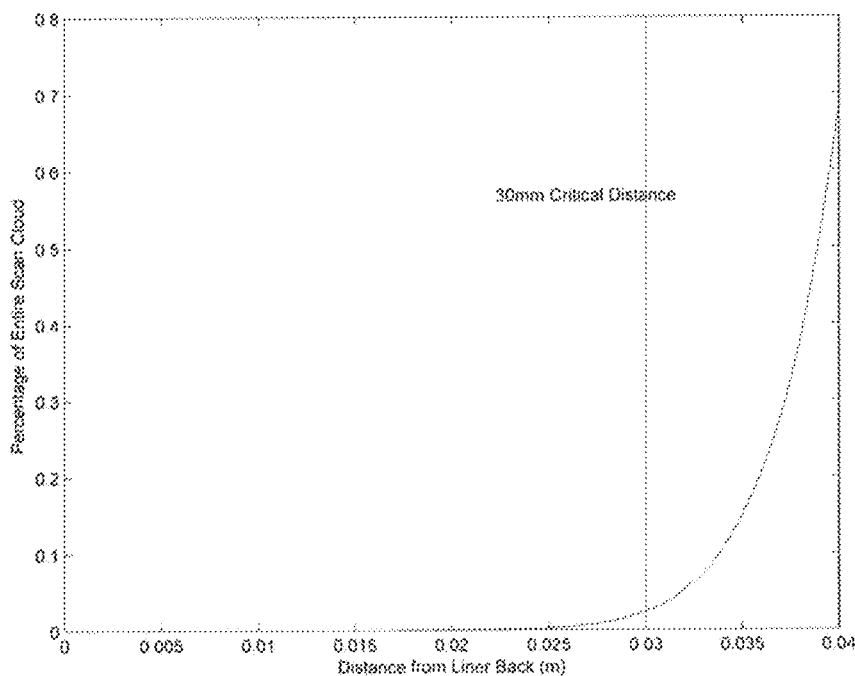
*8. Cumulative histogram of scan points up to 40mm distant from the liner back*
Fig. 24E

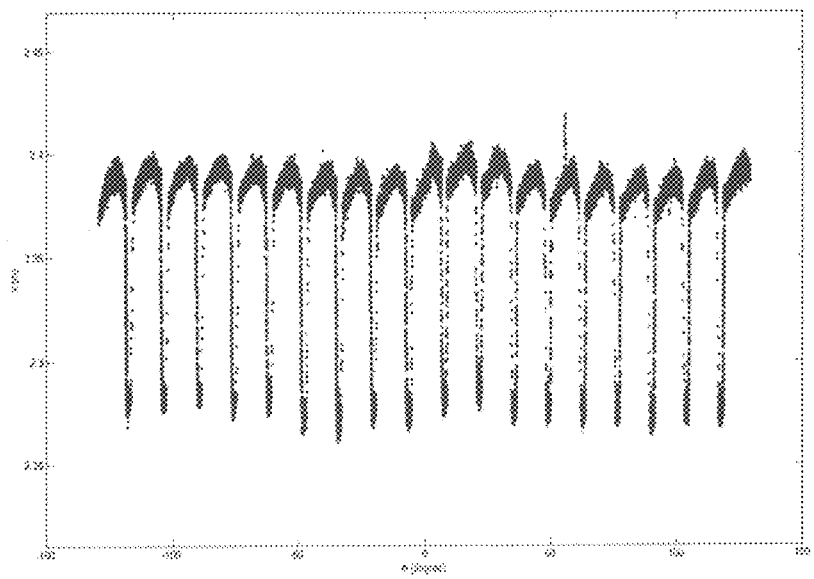
9. Cross section through feed end mill liner along a circle of 3.6 to 3.7 m radius as measured from the mill axis
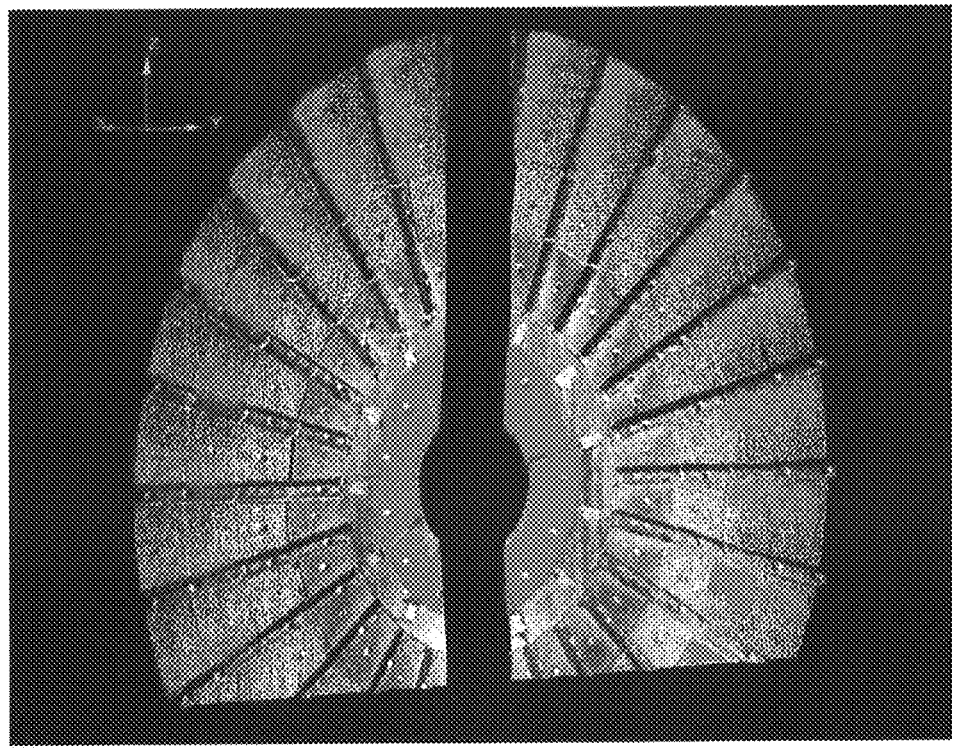
10. Critically worn liner areas below 30mm thickness (in red)
Fig. 24F

SYSTEM AND METHOD FOR MEASURING AND MAPPING A SURFACE RELATIVE TO A REFERENCE

FIELD OF THE INVENTION

The present invention relates to scanning systems and methods for examining surfaces of bodies subject to wear or change over time. The invention has particular, although not exclusive, utility for measuring surfaces and comparing them against historical data to determine whether the surface needs repair or replacement.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

The following discussion of the background art is intended to facilitate an understanding of the present invention only. The discussion is not an acknowledgement or admission that any of the material referred to is or was part of the common general knowledge as at the priority date of the application.

In many applications, it is necessary to assess the wear or change of a surface relative to a base or reference. This information can be utilised for various applications, including assessing whether a surface is safe for use, or when a surface requires repair or maintenance as a result of wear over time.

In certain applications, a liner is often employed as a cost effective means of protecting a base surface from wear or damage. Consequently, the liner takes up wear in preference to the base surface, and is replaced from time to time in lieu of replacing the base surface, which may be more difficult or more expensive to replace.

Assessing the degree of wear of a surface, be it with or without a liner, is difficult or time consuming in certain environments such as where the surface is disposed internally within a cavity or compartment of a body, and especially where that body is rotatable. Conventional measurement tools are often inadequate to perform the task, either with respect to the precision of measurement, safety of performing the task, or economic factors associated with downtime of commercial use of the body whilst the measurement task is undertaken.

In some of these environments, where the comminution of material is involved and liners are used, it is important that liner wear is accurately determined to first ensure the liner is replaced before it wears to a point where it no longer protects the underlying body, and second to maintain the efficiency of the comminution process.

A practical example of the foregoing considerations is in the comminution of minerals within the mining industry. In mineral processing, minerals are extracted from their interlocked state in solid rock by crushing the raw ore into progressively smaller pieces and finally grinding it into a powder. This comminution process is multi-stage, being carried out in a series of crushing then grinding mills.

On the completion of the crushing process, the crushed ore is separated into pieces of a few cm in diameter (actual size depends on the ore type) and may then be fed into rotating cylindrical mills. The rotation of a mill about its axis causes the ore pieces to tumble under gravity, thus grinding the ore into decreasingly smaller fractions. Some types of grinding mills are fitted with grinding bodies such as iron or steel balls (ball mills), steel rods (rod mills) or flint pebbles (pebble mills) which assist in the grinding process. Two specific types of mill are the autogenous mill (AG mill), which operates without any grinding body, and the semi-autogenous mill (SAG mill), in which a small percentage (usually around 10%) of grinding bodies (often steel balls) are added.

A typical mill grinding circuit will comprise a primary grinding system, consisting of a SAG or AG mill and into which the crushed raw ore is fed, and a secondary grinding system, consisting of ball, rod or pebble mills and into which the output from the primary grinding system is fed.

All types of cylindrical mills consist of a cylindrical shell with a feed arrangement at one end and a discharge arrangement on the other. Feed and discharge designs vary. For example, feed chutes and spout feeders are common, whilst screw-type, vibrating drum and scoop-type feeders are also in use. Discharge arrangements are usually classified as overflow, peripheral, grate and open-ended.

The interior of a cylindrical mill is surfaced with a lining designed for the specific conditions of mill operation. Liners can be made of steel, iron, rubber, rubber-steel composites or ceramics. Liners in this application serve two functions:
1. to protect the shell of the mill from damage due to abrasion erosion;
2. to aid grinding performance.

Naturally, mill liners wear through erosion. Normally, chemical solutions that are quite toxic and corrosive to humans and instrumentation alike are introduced into the mill to help with the comminution process. Whilst good liner design can enhance milling efficiency, worn liners have a detrimental effect on milling performance and energy efficiency. Therefore liners must be replaced on a regular basis.

Replacing mill liners requires significant mill downtime which is undesirable from an economic point of view. The downtime is attributable to the time taken to assess the thickness of the liner, and the considerable time needed to replace the liner. Therefore, accurately assessing the thickness of the liner within the mill is of critical importance to the mill operator. Furthermore, the minimisation of mill downtime attributable to liner thickness inspection procedures is also desirable.

One method that has been used to determine mill liner thickness is visual inspection. Once the mill has been stopped and decontaminated, a specialist enters the mill and inspects the liner for cracks, fractures and excessive wear. The problem with this approach is the time consumed in decontaminating the mill, and further, the inaccuracy of relying on the human eye to determine the thickness of an object of which the depth dimension is invisible.

Another method of determining mill liner thickness is via a physical inspection. As is the case with visual inspection, the mill must be stopped and decontaminated before the mill is inspected. A specialist enters the mill and measures the length of nails that have previously been hammered into the liner. As the liner wears faster than the protruding nail, inspection of the length of protrusion provides an indication of wear. The problem with this method is that it is time consuming in terms of mill downtime while decontamination procedures and measurement processes are executed, and further, the inaccuracy of estimating the thickness from measurements of the nail, which itself is subject to wear, against the liner wear. Further, the comparative sparsity of measurement coverage of the liner is also a problem.

Another method of determining mill liner thickness is via acoustic emission monitoring. This method involves monitoring the surface vibrations on the outside of a mill via accelerometer transducers. Estimates are obtained relating to grinding process performance and machine wear analysis. The problem with this approach is that it does not directly measure the mill liner thickness. Rather, it monitors changes in the acoustic output of a mill which could be interpreted as being due to mill liner wear, but could equally be attributable to wear of other parts of the milling machinery.

Another method of determining mill liner thickness is via ultrasonic thickness gauging. It is known by some in the industry to be a well-established technique typically performed using piezoelectric transducers. Ultrasonic gauges measure the time interval that corresponds to the passage of a very high frequency sound pulse through a test material. Sound waves generated by a transducer are coupled into the test material and reflected back from the opposite side. The gauge measures the time interval between a reference pulse and the returning echo. The velocity of sound in the test material is an essential part of the computation. The readings are obtained using a hand-held device which is operated manually within a stationary mill. The operator takes the readings by placing the sensor at selected points on the liner surface. The operator notes the thickness reading and the location on a graphical representation of the mill.

There are several problems with ultrasonic thickness gauging. Firstly, as mentioned previously, the mill must be decontaminated in order for the operator to enter the mill. Secondly, temperature alters sound velocity, and hence calibration is always needed to guarantee accurate readings. Thirdly, it is slow, as each point must be recorded manually. Fourthly, it is difficult to accurately assess liner wear due to the need to ensure that the sensor measurement tool is orthogonal to the mill shell, and the practical difficulty in achieving this.

DISCLOSURE OF THE INVENTION

It is an object of the present invention to ameliorate, mitigate or overcome, at least one of the aforementioned problems associated with prior art mill liner measurement or to at least provide the public with a useful choice in an alternative system for mill liner measurement.

It should be appreciated with the above object said, however, the present invention is in no way limited solely to application with mill liner measurement and may have other applications as discussed elsewhere in the specification.

In accordance with one aspect of the present invention, there is provided a system for measuring the displacement of a surface relative to a base reference, thereof comprising:
scanning means to generate point cloud data between a reference point and a surface disposed distally from said reference point to define a three-dimensional image of said surface;
storage means to store base reference data in respect of a base reference relative to said surface; and
processing means to process said point cloud data and said base reference data to determine the relative displacement of said surface with respect to said base reference.

Preferably, the processing means includes a referencing means to orientate the point cloud data relative to key reference data of the base surface and transform said point cloud of data into a co-ordinate system coinciding with said base reference data, and displacement processing means to calculate the displacement between said surface and said base reference using both sets of data in said co-ordinate system.

Preferably, said processing means includes data editing means to filter spurious point data from the accumulated point cloud data before operation of said referencing means and said displacement processing means.

Preferably, said processing means further includes partitioning means to partition said point cloud data into discrete segments corresponding to different geometrically described sections of said surface before operation of said referencing means and said displacement processing means.

Preferably, said scanning means comprises a laser scanner having:
(i) a transmitter for transmitting laser radiation from said reference point towards said surface;
(ii) a detector proximate to said reference point for detecting reflected laser radiation from said surface; and
(iii) distance processing means to measure the distance between the laser scanner and the surface, and generate point cloud data in respect thereof.

Preferably, said scanning means further includes scanner positioning means to precisely position and orientate the laser scanner in a prescribed manner incrementally about said reference point.

Preferably, the system includes data acquisition means to acquire and accumulate said point cloud data at consecutive incremental orientations of the laser scanner about said reference point to generate said point cloud data three-dimensionally with respect to the surface.

In accordance with another aspect of the present invention, there is provided a method for measuring the displacement of a surface relative to a base reference thereof, comprising:
generating point cloud data between a reference point and a surface disposed distally from said reference point to define a three dimensional image of said surface;
determining the location and direction of key reference parameters of the object defined by the three dimensional image from the point cloud data;
obtaining base reference data in a prescribed co-ordinate system in respect of a base reference relative to said surface; and
processing said point cloud data and said base reference data, orientating the point cloud data relative to the key reference parameters of defined by said base reference data and transforming the point cloud data into a co-ordinate system coinciding with said base reference data.

Preferably, the method includes determining the relative displacement of said surface defined by said point cloud data with respect to said base reference in said co-ordinate system.

In accordance with a further aspect of the present invention, there is provided a system for mapping the displacement of a surface relative to a base reference, thereof comprising:
data processing means to obtain point cloud data defining a surface in a co-ordinate system coinciding with a base reference and to generate displacement data in respect of the displacement between each point of said point cloud and a related point of said base reference;
comparison means to compare the displacement data against a prescribed threshold; and
display means to graphically display the result of the comparison.

Preferably, the display means includes a first format for graphically displaying said point cloud data or said displacement data in a 3D view.

Preferably, the display means includes data manipulation means for unwrapping said point cloud data or said displacement data onto a 2D plane and a second format for graphically displaying same.

Preferably, said second format includes a contour map having different colours or shades representing different magnitudes of displacement relative to said prescribed threshold.

Preferably, the display means includes a third format for calculating a histogram in respect of said displacement data.

Preferably, the display means includes a fourth format or calculating a cumulative distribution histogram in respect of said displacement data.

In accordance with another aspect of the present invention, there is provided a method for mapping the displacement of a surface relative to a base reference, thereof comprising:
obtaining point cloud data defining a surface in a co-ordinate system coinciding with a base reference;
generating displacement data in respect of the displacement between each point of said point cloud and a related point of said base reference;
comparing the displacement data against a prescribed threshold; and
displaying the result of the comparison.

Preferably, the method includes generating cross-sections of displacement data.

BRIEF DESCRIPTION OF THE DRAWINGS

The accompanying drawings illustrate particular features of specific embodiments of the best mode for carrying out the present invention, wherein:

FIG. 14 is a graph of point cloud data in respect of a circular cross section of the feed end around a prescribed radius unwrapped in a 2D plane;

FIG. 15 shows the relative position of the circular cross section shown in FIG. 14 in a three dimensional view of the feed end;

FIGS. 24A-F show an example of a report that can be produced using the mapping means and selected formats for a particular mill.

BEST MODE(S) FOR CARRYING OUT THE INVENTION

Figure 1:
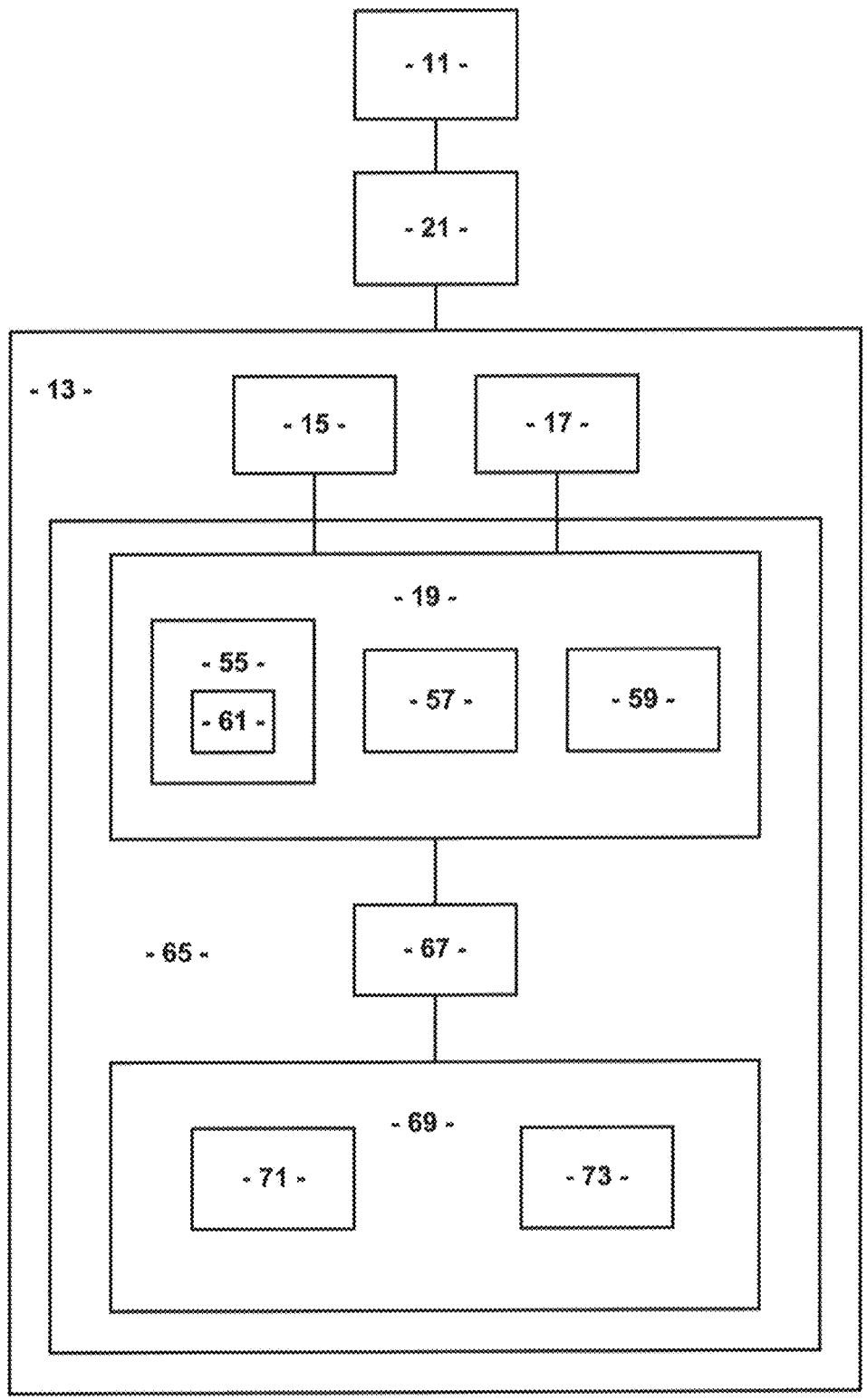
FIG. 1 is a block diagram showing the basic functional components of the system described in the embodiment.

The best mode for carrying out the invention will now be described with reference to one specific embodiment thereof. The description of the specific embodiment makes reference to the accompanying drawings. Accordingly reference numerals referred to herein are used in the drawings to show the corresponding feature described in the embodiment.

The embodiment is directed towards a system and method specifically adapted for mapping and measuring the thickness of a mill liner provided on the inner surface of a mill for grinding rock and ore therein. The liner is provided to protect the inner surface of the shell of the mill and to assist with the comminution process performed by the mill.

As previously discussed, replacing mill liners is a costly, but necessary, task associated with the operation of a mill.

As shown in FIG. 1, the system essentially comprises:
scanning means in the form of a terrestrial laser scanner 11;
computer 13 including:
    data acquisition means 15,
    storage means in the form of a database 17, and
    processing means in the form of processing software 19; and
interface 21 to interface the computer 13 to the scanner 11.

Figure 2:
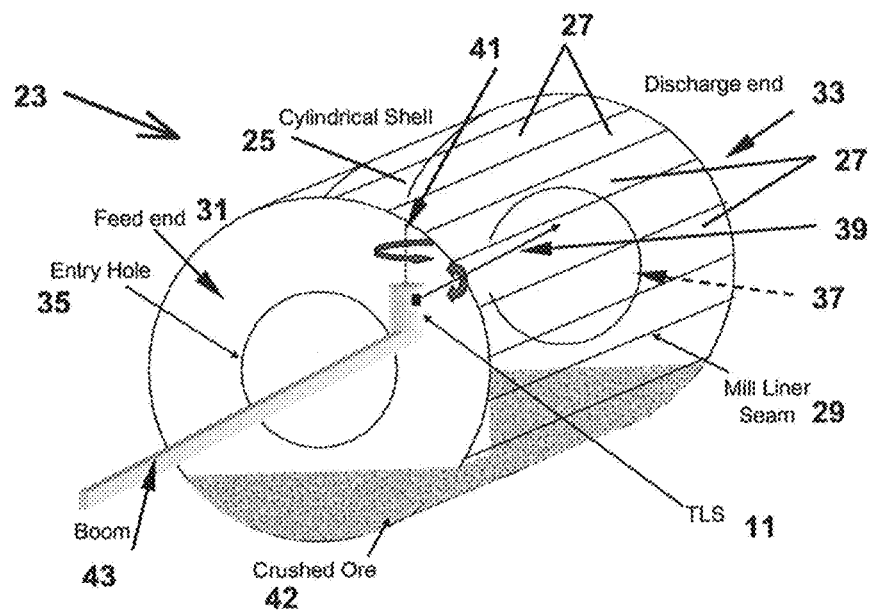
FIG. 2 is schematic diagram showing the setup of the laser scanner within a mill for generating point cloud data in respect of the inner surface of the mill.

As shown in FIG. 2 of the drawings, the laser scanner 11 is used in conjunction with a mill 23 having a cylindrical shell 25, mill liner segments 27 defining mill liner seam lines 29 therebetween, a feed end 31 and a discharge end 33. The feed end 31 has an entry hole 35, and the discharge end 33 is provided with a discharge hole 37.

The laser scanner 11 is a scientific instrument of known design comprising a housing within which is disposed a distance measuring unit (DMU), a mechanism for rotating the distance measuring unit, and scanner electronics interfaced with the DMU and the rotating mechanism for operating the same.

The DMU (not shown) generally comprises:
(i) a transmitter for transmitting laser radiation through a lens and mirror system from a reference point towards a surface;
(ii) a detector disposed proximate to the reference point for detecting reflected laser radiation from the surface through the lens and mirror system; and
(iii) distance processing means to measure the distance between the laser scanner and the surface, and generate point cloud data in respect thereof.

The distance processing means is embodied in appropriate microprocessor circuitry interfaced with the transmitter and detector and the scanner electronics to operate under software control for providing particular functionality for capturing data and outputting same to the data acquisition means 15 by means of the interface 21. This interface 21, can be any type of landline or wireless network connection accepting data output from the laser scanner 11 and inputting it to the computer 13 for software controlled acquisition and accumulation by the data acquisition means 15.

The terrestrial laser scanner 11 used in the preferred embodiment is a high precision three-dimensional (3D) laser scanner that collects a large amount of precise 3D point measurements to generate point cloud data by directly measuring distance to a remote surface by time of flight laser range-finding. The laser scanner 11 is particularly characterised by the following technical characteristics/specifications:
  Able to capture data in a near-spherical field of view (FOV) (i.e., 360° horizontal FOV, 320° vertical FOV)
  Able to capture a dense dataset in the order of several millions of points throughout the full field of view within a few minutes
  Small enough to be fit through the access hole into the mill
  Able to function normally when oriented upside down or its vertical rotation axis is not vertical
  Measurement accuracy of ±3 mm or better
  The distance measurement unit performance is such that the data are not biased by the reflectance properties of the liner surface
  Able to be operated remotely by cable or other means from a distance of several meters
  Able to be pre-calibrated for systematic errors.

Typically resolution can be adjusted to obtain measurements of point cloud data in a 3D Cartesian co-ordinate system in the order of 45 million points or more at a density in the order of 60 points per square cm, using either pulse or phase difference methods of calculation.

Time of flight is the return propagation time of emitted laser radiation from the transmitter and is measured to calculate the distance from a fixed reference point, which defines the origin of a Cartesian co-ordinate system, to the reflecting surface during sequential scans of the laser scanner 11. Consequently, horizontal and vertical angles at which the laser is emitted are measured and it is from these and the propagation distance that the Cartesian co-ordinates are calculated to provide point cloud data for each point.

The scanner 11 incorporates scanner positioning means to precisely position and automatically orientate the DMU of the laser scanner in an incremental manner about the fixed reference point, performing each of its scans to obtain overall a near spherical coverage of the surrounding environment. Moreover, with reference to FIG. 2, the scanner 11 in the present embodiment performs a series of 320° sweeps about a horizontal axis 39, to obtain point cloud data in respect of the surface of the inner liners of the mill shell. One sweep would commence at a position of 20° from the vertical axis 41, downwardly directed, then sweep though an arc of 320° in a vertical plane, to terminate at a position of 340° downward relative to the vertical axis 41. During this sweep, the point cloud data would be sequentially acquired and accumulated by the data acquisition means.

After completing one sweep; the scanner would rotate angularly about the vertical axis 41, a prescribed increment, and perform another 320° sweep. The angular increments about the vertical axis 41 would continue for successive sweeps until the scanner had completed an entire 180° rotation to generate a near spherical 3D point cloud data.

In practice, setup of the laser scanner 11 involves the mill being stopped and decontaminated to a requisite extent, allowing the residual crushed ore 42 to be safely reposed at the bottom of the shell 25. As the inside of the mill is typically a highly corrosive environment to aid in the comminution process, decontamination is desirable before the laser scanner is placed inside the mill 23.

The laser scanner can be positioned inside the mill by any suitable means, but in the present embodiment a boom 43 to which the scanner 11 is fixedly and rigidly attached is passed through the entry hole 35 to position the scanner centrally within the shell 25. The boom is then rigidly secured at this position to remain stationary during subsequent scanning operations performed by the laser scanner. In other embodiments the scanner can be manually set atop a tripod, although this is not preferred, as this would require a user to enter the mill, which is not desirable for health and safety reasons.

In the present embodiment, the scanner 11 is placed as close to the centre of the mill as possible, although the positioning does not have to be exact.

The scanner 11 is operated remotely via the interface 21 and controlled by scanner operating software provided on the computer 13. This operating software includes the data acquisition means 15.

Data acquisition parameters of this operating software are set to capture 3D data of the inside of the mill surfaces at high spatial resolution (i.e. point spacing) and near-spherical angular field of view, in the manner as previously described.

Once data capture is complete, the scanner is removed from the mill and captured point cloud data are exported from the data acquisition means 15 to an ASCII text file as Cartesian (i.e. X, Y, Z) co-ordinates referenced to the fixed reference point of the internally-defined co-ordinate system of the scanner, and the ASCII test file is stored on the computer 13.

These data are subsequently imported into the processing software 19 provided on the computer for processing with base reference data stored on the database 17 to determine the relative displacement of the surface of the mill liners with respect to the base reference, which will now be described below in greater detail.

Figure 3:
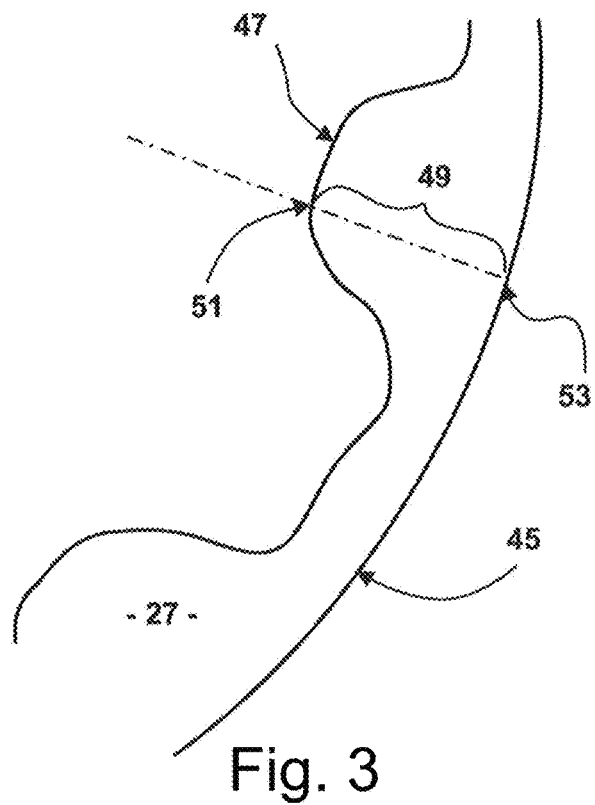
FIG. 3 is a fragmentary sectional diagram showing the relative profile of the inner surface of the cylindrical shell to the front surface of the liner and the displacement measurement obtained for determining the thickness of the liner.

The database 17 of the computer is designed to store base reference data in respect of a base reference specified for the particular mill being scanned. As shown in FIG. 3, this base reference in the present embodiment is the inner surface 45 of the shell 25 on which the mill liner segments 27 are affixed. The mill liners thus define a mill liner surface 47 that is distally spaced and thus displaced relative to the base reference, being the inner surface 45, defined by the base reference data. This displacement 49, shown with respect to one point 51 of the point cloud of data for which point cloud data is acquired from the laser scanner, corresponds to the thickness of the liner segment 27 at that point relative to the position 53 of the inner surface 45 of the shell orthogonally adjacent thereto. This position 53 is obtained from the base reference data stored in the database.

The base reference data may be obtained from a CAD model of the mill or from a scanning of the internal shell without the liners in place, and thus is referenced to its own co-ordinate system, the X-axis of which is defined by the longitudinal axis of the mill. Thus the base reference data is characterised by certain key reference data comprising critical mill parameters that describe the geometry of the base reference of the mill, namely the location of the central longitudinal axis of the cylindrical shell, the shell radius and the length of the cylindrical portion of the shell.

In the present embodiment, the database 17 is maintained with critical mill parameters for each mill, which will vary from mill to mill depending upon the particular mill shape and configuration. In the case of a mill having a shell configuration as shown in FIG. 2, and as shown diagrammatically in FIGS. 4 and 5, the critical mill parameters stored in the database are:
  the radius of the mill from the central axis to the back of the liner (BOL) that corresponds to the inner surface 45 of the cylindrical portion or belly of the shell,
  the distance of the corner points within the belly liner seam lines 29 to the feed end 31 (hereafter called the FD corner points),
  the length of the mill between the feed end 31 BOL and discharge end 33 BOL (see FIG. 4), and/or
  the distance between a placed and scanned reference surface and the BOL feed or discharge end (see FIG. 5).

For mills with conical rather than planar ends, the cone angle relative to the cylinder axis and distance between feed and discharge end apexes are also required.

The base reference data for the database is created a priori from either mill CAD models provided for the mill or a scan of a liner-less shell.

The co-ordinate system of the displacement data obtained by the laser scanner is referenced to the reference point of the laser scanner, whereas the base reference data for the mill is referenced to its own co-ordinate system related to the geometry of the mill. Therefore in order to derive accurate displacement data indicative of the mill liner segment thickness at any particular point, the two sets of data need to be correlated. Accordingly, an important aspect of the processing software 19 is to provide for this correlation.

Thus, as also shown in FIG. 1, the processing software 19 generally comprises a number of notional processes including data editing means 55, referencing means 57 and displacement processing means 59.

Since the laser scanner 11 collects data in a near spherical field of view, the raw point cloud data accumulated by the data acquisition means 15 also contains spurious points from outside the mill, collected when the laser beam passes through the holes 35 and 37 in the feed and discharge ends, respectively. These unwanted points are first filtered out from the accumulated point cloud data by the data editing means 55.

The data editing means 55 also includes partitioning means 61 to partition the point cloud data into discrete segments corresponding to different geometrically described sections of the BOL surface 45 before operation of the referencing means 57 and said displacement processing means 59.

The segments of the point cloud representing the cylinder (belly) 25, feed end 31 and discharge end 33 sections of the mill correspond to different geometrically described sections and are thus separated at this stage so that they can be processed individually.

The referencing means 57 provides for the orientation of the point cloud data relative to the critical mill parameters and the transformation of the point cloud of data into the co-ordinate system coinciding with the base reference data.

As discussed, the scanner data are referenced to the internal co-ordinate system of the instrument, which is not aligned with that of the CAD model of the mill. Since the model serves as the reference for liner thickness computations, it is necessary to transform the observed point data into a co-ordinate system such that it coincides with that used for the reference data of the shell. The transformation parameters are unknown and must therefore be estimated from the data.

The referencing means 57, as a first step, includes an estimating process to estimate the cylinder axis from said point cloud data and a transformation process to transform the data so that this axis and that of the CAD model reference data, mathematically coincide. Liner thickness can then be computed, as a second step, for each point by the displacement processing means 59.

To estimate the cylinder axis and orientate the point cloud data to the base reference data of the CAD model, the estimation process is programmed to implement an algorithm based on the following mathematical modelling.

The functional model adopted for a point, p, lying on an unbounded circular cylinder with its axis nominally aligned with the x-axis is:

$$Y_p^2 + Z_p^2 - r^2 = 0$$

where:

$$\begin{vmatrix} X_p \\ Y_p \\ Z_p \end{vmatrix} = \begin{vmatrix} \cos\kappa & \sin\kappa & 0 \\ -\sin\kappa & \cos\kappa & 0 \\ 0 & 0 & 1 \end{vmatrix} \begin{vmatrix} \cos\varphi & 0 & -\sin\varphi \\ 0 & 1 & 0 \\ \sin\varphi & 0 & \cos\varphi \end{vmatrix} \begin{vmatrix} x_p - x_m \\ y_p - y_c - y_m \\ z_p - z_c - z_m \end{vmatrix}$$

$$= \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

and the cylinder parameters are:
r cylinder radius
$y_c$, $z_c$ cylinder position in y and z directions
$\varphi$, $\kappa$ rotation angles of cylinder about y and z axes
$x_m$, $y_m$, $z_m$ co-ordinates of centroid (mean position of all belly liner points; subtracted to improve numerical stability).

The definitions used by the estimating process for working the model are:
the vector of u (where u=5) parameters such that:

$$\underset{u,1}{x} = |r \; y_c \; z_c \; \varphi \; \kappa|^T$$

the vector of n 3D co-ordinate observations on the surface of the cylinder so that:

$$\underset{n,1}{b} \lfloor x_1 \; y_1 \; z_1 \; x_2 \; y_2 \; z_2 \; \ldots \; x_m \; y_m \; z_m \rfloor^T$$

where n=3m, and m is the number of observed points.

The least-squares solution methodology is then applied whereby:
the Functional notation is represented by:

$$f(x,b) = Y^2 + Z^2 - r^2 = 0$$

and linearisation is provided by the truncated Taylor series:

$$f(x, b) \approx f(x^0, b) + \frac{\partial f}{\partial x}\hat{\delta} + \frac{\partial f}{\partial b}\hat{r} = \underset{m,1}{w} + \underset{m,uu,1}{A \hat{\delta}} + \underset{m,nn,1}{B \hat{r}} = \underset{m,1}{0}$$

where
$x^0$ is the vector of approximate parameter values. For $y_c$, $z_c$ and $\phi$, $\kappa$ these are assumed to be zero. For r, the reference surface radius of the belly liner is used)($r^0$)
$w = f(x^0, b)$ is the vector of m cylinder functions (one per point) evaluated at the approximate parameter values and observation point co-ordinates $$A = \frac{\partial f}{\partial x}$$

is the Jacobian matrix of partial derivatives of the cylinder function taken with respect to each of the five parameters $$B = \frac{\partial f}{\partial b}$$

is the Jacobian matrix of partial derivatives of the cylinder function taken with respect to each observed point co-ordinate
$\hat{\delta}$ is the vector of corrections to the approximate parameter values
$\hat{r}$ is the vector of observation residuals.
The least squares solution of $\hat{\delta}$ is then:

$$\underset{u,1}{\hat{\delta}} = -\left(\underset{u,m}{A^T} \left(\underset{m,n}{B} \underset{n,n}{P^{-1}} \underset{n,m}{B^T}\right)^{-1} \underset{m,u}{A}\right)^{-1} \underset{u,m}{A^T} \left(\underset{m,n}{B} \underset{n,n}{P^{-1}} \underset{n,m}{B^T}\right)^{-1} \underset{m,1}{b}$$
$$= -N^{-1} u$$

where P is the (diagonal) weight matrix of observations, and the observation weight is the reciprocal of the variance.
The updated parameter estimates then become:

$$\hat{x} = x^0 + \hat{\delta}$$

providing a solution which is iterated using Newton's method until all elements of the parameter correction vector are insignificant.

The referencing means 57 subsequently transforms each point from the scanner co-ordinate system (x, y, z) into the mill system (X, Y, Z) using the transformation process wherein the estimated transformation parameters are:

$$\begin{vmatrix} X_p \\ Y_p \\ Z_p \end{vmatrix} = \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

Note that the X axis coincides with the cylinder axis.

The displacement processing means 59 then provides for calculating the displacement between the liner segment surface and the base reference using both sets of data in the co-ordinate system of the base reference data.

Moreover, the radius (orthogonal distance from the cylinder axis to observation point) at point p is calculated as:

$$r_p^c = \sqrt{Y^2 + Z^2}$$

The liner thickness at point p is then the difference between the initial approximate radius (the radius of the reference surface of the belly liner) and the calculated radius $$t_p^{liner} = \delta r = r^0 - r_p^c$$

After the liner thickness for the belly section is calculated, the liner thickness for the feed and discharge ends also needs to be calculated.

To calculate liner thickness at the feed and discharge ends, it is necessary to not only transform, but position the point cloud data segments that were discretely partitioned and stored for these ends by the partitioning means 61, relative to the BOL surfaces, constituting the base reference data for the feed and discharge ends, along the cylinder axis. This can be done by the referencing means including a positioning process that is programmed to operate in accordance with one of two methods:
1. Extraction of the belly liner gap points (FD corners) from the scanner data.
2. Inclusion of a planar feature placed at a known (relative to the BOL surface) location in or near the mill at the time of data acquisition.

Figure 4:
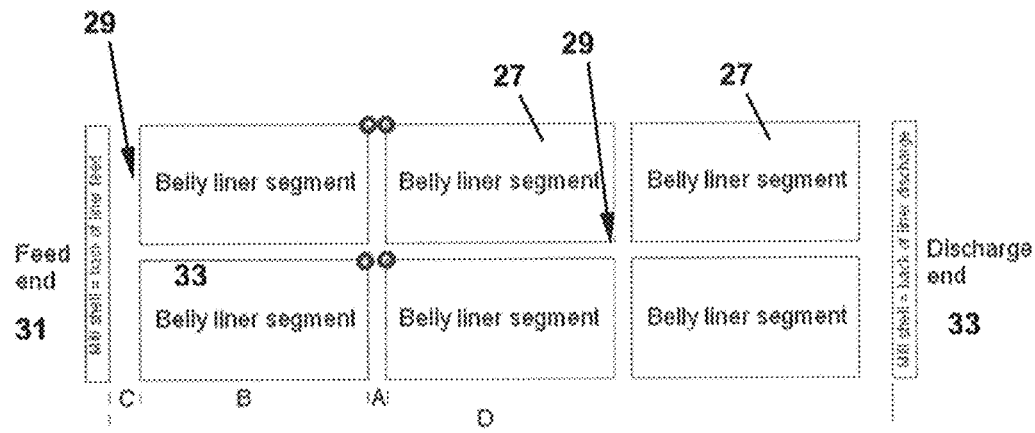
FIG. 4 is a schematic diagram of the principal components of the mill showing the gaps that need to be determined for performing the first method of calculating the liner thickness at the feed and discharge ends.

Having regard to FIG. 4, the first method, known as the gap point two parallel plane method, requires the positioning process to determine the gap points A, the length of the belly liner segments B, the gap C between the end of an adjacent belly liner segment and the feed end, and the overall longitudinal extent D of the belly of the mill.

The along-axis distance of the gap points A to D from the feed and discharge ends can be obtained from the base reference data of the CAD plan of the mill, or determined by scans of the mill without the liners for the feed and discharge ends of the mill in place, i.e. by scanning the bare mill shell which corresponds with the back of liner (BOL) before taking into account possible rubber backing. Once these data are obtained, an along-axis translation is able to be computed.

Essentially, the method involves:
a) Determining the gap points at all corners within one vertical plane (i.e. left hand circles depicted in FIG. 4) of visible belly liner segments all around the mill cylinder by extraction from scan cloud;
b) Determining gap points at all corners opposing those in a) within one vertical plane (i.e. right hand circles depicted in FIG. 4) of visible belly liner segments all around the mill cylinder by extraction from scan cloud;
c) Determining the halfway plane between planes though points extracted under a) and b);
d) Determining BOL feed position=½A+B+C
e) Determining BOL discharge=BOL feed+D.

Variations that may need to be accommodated in different mill designs to that shown in FIG. 4 may include belly liner segments shaped different to a rectangle (view at liner surface), eg trapezoid. C may comprise a physical gap, a filler ring or any other mill specific element.

Figure 5:
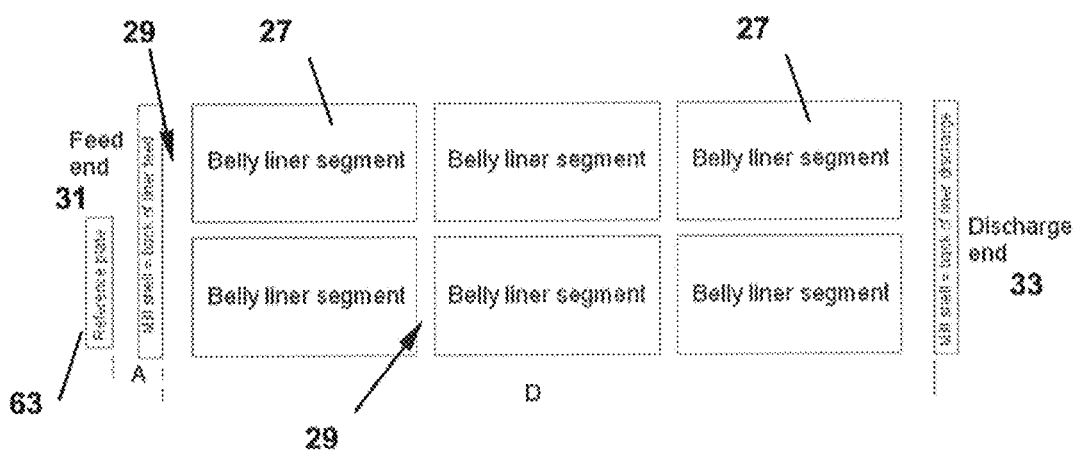
FIG. 5 is a schematic diagram of the principal components of the mill showing the gaps that need to be determined for performing the second method of calculating the liner thickness at the feed and discharge ends.

With respect to the second method, known as the planar feature point method, as shown in FIG. 5, a feature or reference plate 63 is disposed at the entry hole 35 of the feed end 31 and the positioning process determines dimensions: A' pertaining to the distance between the reference plate and the inner surface of the feed end; and D' pertaining to the longitudinal extent of the cylindrical shell or belly; either by extraction from CAD models of mills or determination from scans of the mill without liners in place, i.e. by scanning the bare mill shell which corresponds with the back of liner (BOL) before taking into account possible rubber backing.

The method then entails:
a) Scanning of mill for wear monitoring after reference plate is positioned at known distance A'
b) Determination of BOL feed=Reference plate plane+A'
c) Determination of BOL discharge=BOL feed+D'

Variations that may need to be accommodated in different mill designs to that shown in FIG. 5 may include the reference plate 63 being positioned at any other location, the reference plate being an object of other than planar shape, the mill ends being flat, conic, or of any other shape, and variations in liner element arrangement.

In the present embodiment, the processing software 19 can be used to determine liner thickness for either of two types of mill end: planar and conical.

Regardless of the method used, the referencing means again invokes the transformation process to transform each point (for the feed end data, discharge end data, and the reference plate placed in or on the mill) from the scanner co-ordinate system (x, y, z) into the mill system (X, Y, Z) using the estimated transformation parameters as previously determined during the belly processing and mathematically represented as:

$$\begin{vmatrix} X_p \\ Y_p \\ Z_p \end{vmatrix} = \begin{vmatrix} \cos\kappa\cos\varphi & \sin\kappa & -\cos\kappa\sin\varphi \\ -\sin\kappa\cos\varphi & \cos\kappa & \sin\kappa\sin\varphi \\ \sin\varphi & 0 & \cos\varphi \end{vmatrix} \begin{vmatrix} x_p - x_m \\ y_p - y_c - y_m \\ z_p - z_c - z_m \end{vmatrix}$$

Thereafter the algorithm for the referencing means follows one of two branches dependent on the shell type (planar or conical) and the particular method adopted (the gap point two parallel planes or planar feature methods referred to above) and invokes the estimating process to estimate the critical parameters applicable to the particular method. The planar feature method is generally the preferred method, although this depends on whether a reference plane is able to be setup or defined for the mill measurements, due to the fewer gap points that need to be determined from the reference data.

In the case of choosing the gap point two parallel planes method for a shell with planar ends, the referencing means uses a simultaneous least-squares fit methodology.

Here, the FD corner point loci are used to estimate the parameters of the parallel, best-fit planes in order to determine the along-axis, BOL distance to the feed and discharge ends.

The referencing means 57 then proceeds using an orientating process to apply the following functional model to orientate the point cloud data relative to key reference data of the feed and discharge ends and to transform the point cloud of data into a co-ordinate system coinciding with the base reference data for the feed and discharge ends respectively.

For a point, p, lying on unbounded plane 1 (plane closest to the feed end), the functional model is represented by:

$$ax_p + by_p + cz_p = d_1$$

The functional model for a point, q, lying on unbounded plane 2 (plane closest to the discharge end) that is parallel to plane 1, is represented by:

$$ax_q + by_q + cz_q = d_2$$

where:
a, b, c are the direction cosines common to planes 1 and 2
$d_1$, $d_2$ are the distances of the planes from the origin.

The definitions used for working the model are:
Let the vector of u (where u=5) parameters be the direction cosines plus the two distance parameters:

$$\underset{u,1}{x} = |a \ b \ c \ d_1 \ d_2|^T$$

Let the vector of n "point-on-plane" observations conditions be I and where n=p+q, and p and q is the number of observed points on planes 1 and 2, respectively.

Applying the least-squares solution methodology:
Functional notation:

$$b = f(x)$$

Linearisation by truncated Taylor series:

$$b + \hat{r} \approx f(x^0) + \frac{\partial f}{\partial x} \hat{\delta}$$

$$\hat{r} = f(x^0) - b + \frac{\partial f}{\partial x} \hat{\delta}$$

$$\underset{n,1}{\hat{r}} = \underset{n,1}{w} + \underset{n,uu,1}{A \ \hat{\delta}}$$

The following weighted constraint is required to enforce unit length of the direction cosine vector:

$$g(x) = a^2 + b^2 + c^2 = 1$$

The linearised form of constraint equation is given by:

$$\hat{r}_c = g(x^0) + \frac{\partial g}{\partial x} \hat{\delta}$$

$$\underset{1,1}{\hat{r}_c} = \underset{1,1}{w_c} + \underset{1,u\,u,1}{G_c \ \hat{\delta}}$$

where:

$$G_c = G_c = \frac{\partial g}{\partial x}$$

is the Jacobian matrix of partial derivatives of the constraint equation with respect to the plane parameters;
$w_c$ is the evaluated constraint equation; and
$\hat{r}_c$ is the constraint residual.

The least squares solution of $\hat{\delta}$ is then:

$$\hat{\delta} = (A^T PA + G^T P_c G)^{-1}(A^T Pw + G^T P_c w_c)$$

$P_c$ is the (scalar) weight matrix of constraints, and is chosen such that $P_c \gg$ the elements of P.

Updated parameter estimates become:

$$\hat{x} = x^0 + \hat{\delta}$$

The solution is iterative using Newton's method until all elements of the parameter correction vector are insignificant.

The displacement processing means 59 then provides for calculating the displacement between the liner segment surface and the base reference using both sets of data in the co-ordinate system of the base reference data, commencing with the feed end. The point cloud data are already transformed and the calculation proceeds as follows:

1. The position of the BOL surface (plane) along the cylinder (X) axis is:

$$d_f = \frac{d_1 + d_2}{2} + D$$

where D is the distance from the midpoint of the FD corner points to the feed end datum measured along the cylinder axis (derived from the CAD model).

2. For a point S on the surface of the feed end, the mill liner thickness is calculated as:

$$t_S^{liner} = X_S - d_f$$

The displacement processing means 59 then proceeds with calculating the liner thickness at the discharge end as follows:

1. The position of the BOL surface (plane) along the cylinder (X) axis is:

$$d_d = L + d_f$$

where L is the distance between discharge end and feed end BOLs measured along the cylinder axis (derived from the CAD model).

2. For a point S on the surface of the feed end, the mill liner thickness is calculated as:

$$t_S^{liner} = X_S - d_d$$

In the case of choosing the planar feature point method for a shell with planar ends the referencing uses a simultaneous least-squares fit methodology again.

According to this methodology, the measured data points on the planar feature placed into the mill at the time of acquisition are extracted and transformed (as described). These data are used to estimate the parameters of a best-fit plane in order to determine the along-axis, BOL distance to the feed and discharge ends.

The referencing means 57 proceeds with applying the following functional model.

For a point, p, lying on unbounded plane 1 (plane closest to the feed end) the functional model is represented by:

$$ax_p + by_p + cz_p = d$$

where:
a, b, c are the direction cosines common to plane 1
d is the distance of the plane from the origin.
The definitions used for working the model are:
Let the vector of u (where u=4) parameters be the direction cosines plus the two distance parameters $$\underset{u,1}{x} = |a\ b\ c\ d|^T$$

Let the vector of n "point-on-plane" observations conditions be b and where n=p (p is the number of observed points on the plane).

Applying the least-squares solution methodology:
Functional notation:

$$b = f(x)$$

Linearisation by truncated Taylor series:

$$b + \hat{r} \approx f(x^0) + \frac{\partial f}{\partial x} \hat{\delta}$$

$$\hat{r} = f(x^0) - b + \frac{\partial f}{\partial x} \hat{\delta}$$

$$\underset{n,1}{\hat{r}} = \underset{n,1}{w} + \underset{n,uu,1}{A\ \hat{\delta}}$$

The following weighted constraint is required to enforce unit length of the direction cosine vector:

$$g(x) = a^2 + b^2 c^2 = 1$$

The linearised form of constraint equation is given by:

$$\hat{r}_c = g(x^0) + \frac{\partial g}{\partial x} \hat{\delta}$$

$$\underset{1,1}{\hat{r}_c} = \underset{1,1}{w_c} + \underset{1,u}{G_c}\ \underset{u,1}{\hat{\delta}}$$

where:

$$G_c = G_c = \frac{\partial g}{\partial x}$$

is the Jacobian matrix of partial derivatives of the constraint equation with respect to the plane parameters;
$w_c$ is the evaluated constraint equation; and
$\hat{r}_c$ is the constraint residual.

The least squares solution of $\hat{\delta}$ is then:

$$\hat{\delta} = (A^T P A + G^T P_c G)^{-1}(A^T P w + G^T P_c w_c)$$

$P_c$ is the (scalar) weight matrix of constraints, chosen such that $P_c \gg$ the elements of P.

Updated parameter estimates become:

$$\hat{x} = x^0 + \hat{\delta}$$

The solution is iterative using Newton's method until all elements of the parameter correction vector are insignificant.

The displacement processing means 59 then computes the liner thickness from the already transformed points as follows:

Firstly for the feed end calculations
1. The position of the BOL surface (plane) along the cylinder (X) axis is:

$$d_f = d + D$$

where D is the distance from the location of the planar feature location to the feed end datum measured along the cylinder axis (derived from the CAD model)

2. For a point S on the surface of the feed end, the mill liner thickness is calculated as:

$$t_S^{liner} = X_S - d_f$$

The discharge end calculations are then performed:
1. The position of the BOL surface (plane) along the cylinder (X) axis is:

$$d_d = L + d_f$$

where L is the distance between discharge end and feed end BOLs measured along the cylinder axis (derived from the CAD model)

2. For a point S on the surface of the discharge end, the mill liner thickness is calculated as:

$$t_S^{liner} = X_S - d_d$$

In the case of using the gap point two parallel planes method for a shell having conical ends a simultaneous least-squares fit methodology is followed. The referencing means 57 performs the estimation of the parallel plane parameters in the same manner as previously described for the planar end shell.

The displacement processing means 59, however, computes the liner thickness from the already transformed points as follows:

Firstly for the feed end calculations:
1. Position of the apex of the BOL cone surface along the cylinder (X) axis:

$$d_f = \frac{d_1 + d_2}{2} + D$$

where D is the distance from the midpoint of the FD corner points to the feed end cone apex measured along the cylinder axis (derived from the CAD model).

2. For each point S on the feed end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_f \\ Y_S \\ Z_S \end{vmatrix}$$

3. Given the equation of the cone (with origin at its apex):

$$Y'^2 + Z'^2 = m^2 X'^2$$

where m is the slope of the cone calculated from the cone angle θ (derived from the CAD model) as:

$$m = \tan\theta$$

The mill liner thickness (orthogonal distance to cone surface) at point S is then calculated as:

$$t_S^{liner} = \frac{mX'_S - \sqrt{Y'^2_S + Z'^2_S}}{\sqrt{1+m^2}}$$

Then the discharge end calculations are performed:
1. The position of the apex of the BOL cone surface along the cylinder (X) axis is:

$$d_d = L + d_f$$

where L is the distance between discharge end and feed end cone apexes measured along the cylinder axis (derived from the CAD model).

2. For each point S on the discharge end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_d \\ Y_S \\ Z_S \end{vmatrix}$$

3. Given the equation of a cone (with origin at its apex):

$$Y'^2 + Z'^2 = m^2 X'^2$$

where m is the slope of the cone calculated from the cone angle θ (derived from the CAD model) as:

$$m = -\tan\theta$$

the mill liner thickness (orthogonal distance to cone surface) at point S is calculated as:

$$t_S^{liner} = \frac{mX'_S - \sqrt{Y'^2_S + Z'^2_S}}{\sqrt{1+m^2}}$$

In the case of using the planar feature point data method for a shell having conical ends a simultaneous least-squares fit methodology is also followed. The referencing means 57 performs the estimation of the plane parameters as previously described for gap point two parallel plane method used for a planar end shell.

The displacement processing means 59, however, computes the liner thickness from the already transformed points as follows:

Firstly for the feed end calculations:
1. Position of the apex of the BOL cone surface along the cylinder (X) axis:

$$d_f = d + D$$

where D is the distance from the location of the planar feature location to the feed end cone apex measured along the cylinder axis (derived from the CAD model).

2. For each point S on the feed end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_f \\ Y_S \\ Z_S \end{vmatrix}$$

3. Given the equation of a cone (with origin at its apex):

$$Y'^2 + Z'^2 = m^2 X'^2$$

where m is the slope of the cone calculated from the cone angle θ (derived from the CAD model) as:

$$m = \tan\theta$$

the mill liner thickness (orthogonal distance to cone surface) at point S is then calculated as:

$$t_S^{liner} = \frac{mX'_S - \sqrt{Y'^2_S + Z'^2_S}}{\sqrt{1+m^2}}$$

The discharge end calculations are then performed as:
1. The position of the apex of the BOL cone surface along the cylinder (X) axis is:

$$d_d = L + d_f$$

where L is the distance between discharge end and feed end cone apexes measured along the cylinder axis (derived from the CAD model).

2. For each point S on the discharge end surface, perform the following translation along the x-axis (cylinder axis) to the cone apex:

$$\begin{vmatrix} X'_S \\ Y'_S \\ Z'_S \end{vmatrix} = \begin{vmatrix} X_S - d_d \\ Y_S \\ Z_S \end{vmatrix}$$

3. Given the equation of the cone (with origin at its apex):

$$Y'^2 + Z'^2 = m^2 X'^2$$

where m is the slope of the cone calculated from the cone angle θ (derived from the CAD model) as:

$$m = -\tan\theta$$

The mill liner thickness (orthogonal distance to cone surface) at point S is then calculated as:

$$t_S^{liner} = \frac{mX'_S - \sqrt{Y'^2_S + Z'^2_S}}{\sqrt{1+m^2}}$$

The processing software 19 also provides for statistical analysis and quality control using appropriate software processing modules.

In the present embodiment the following metrics are rigorously calculated for the cylinder and plane fit processes for quality assurance of the liner thickness computations:

1. Covariance matrix of estimated parameters: standard deviations that indicate parameter precision and the correlation coefficient between parameters that can flag weak geometry are analysed;
2. Least-squares residuals are tested using data snooping methods to identify and subsequently remove outlier points. Root mean square (RMS) and maximum residual metrics are also calculated;
3. The estimated variance factor is used as a further indicator of the presence of outliers and/or incorrect weight matrix selection.

A check is also made of the plane (parallel and individual) direction cosine parameters, a, b and c. Due to the point transformation using the rotation matrix from the cylinder fit, M, the first parameter (a) should be unity and the others (b and c) equal to zero. Differences from idealised values are analysed for numerical significance.

The results of all of the aforementioned metrics are logged at various stages of processing as quality assurance (QA) measures to ensure data integrity.

An important advantage of the present embodiment is that the mill dataset ultimately obtained can be used to yield a comprehensive statistical and graphical report to the user. As shown in FIG. 1, the system includes mapping means 65 to provide the user with a number of different formats for reporting the results of the scan on completion of the thickness computations.

Figure 6:
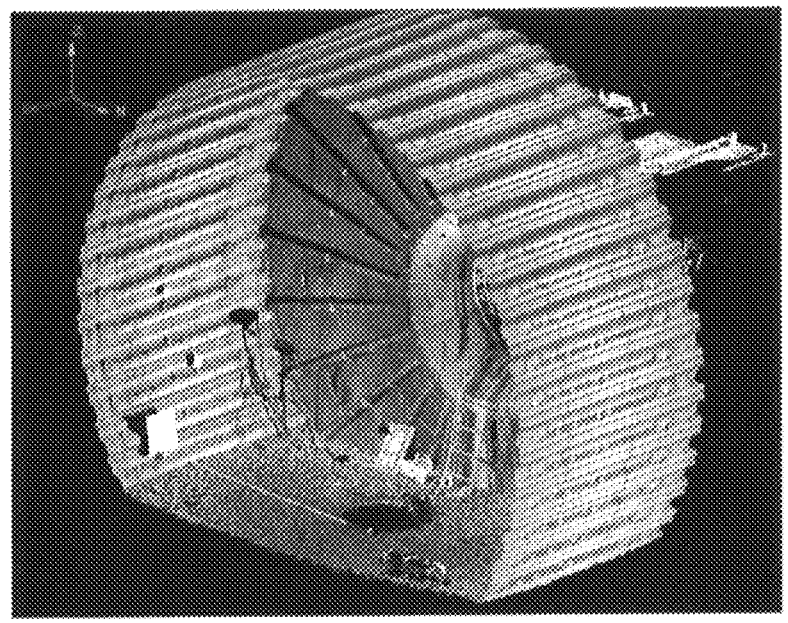
FIG. 6 is a 3D representation of the point cloud data derived from a laser scan showing the liner surface of a cylindrical segment of the shell and the feed end of the mill.
Figure 7:
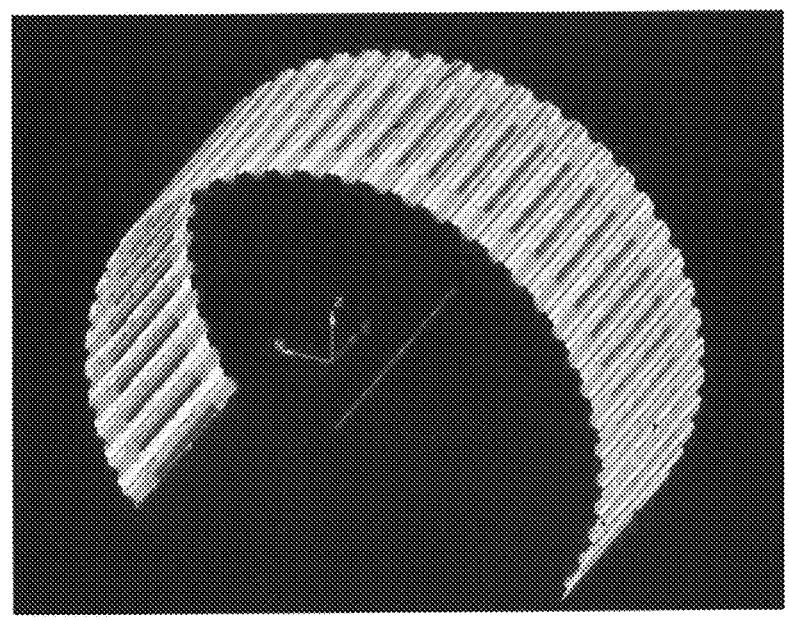
FIG. 7 is a 3D image of the extracted linear segment showing displacement data coloured or shaded relative to the magnitude of the displacement to the back of the liner.
Figure 8:
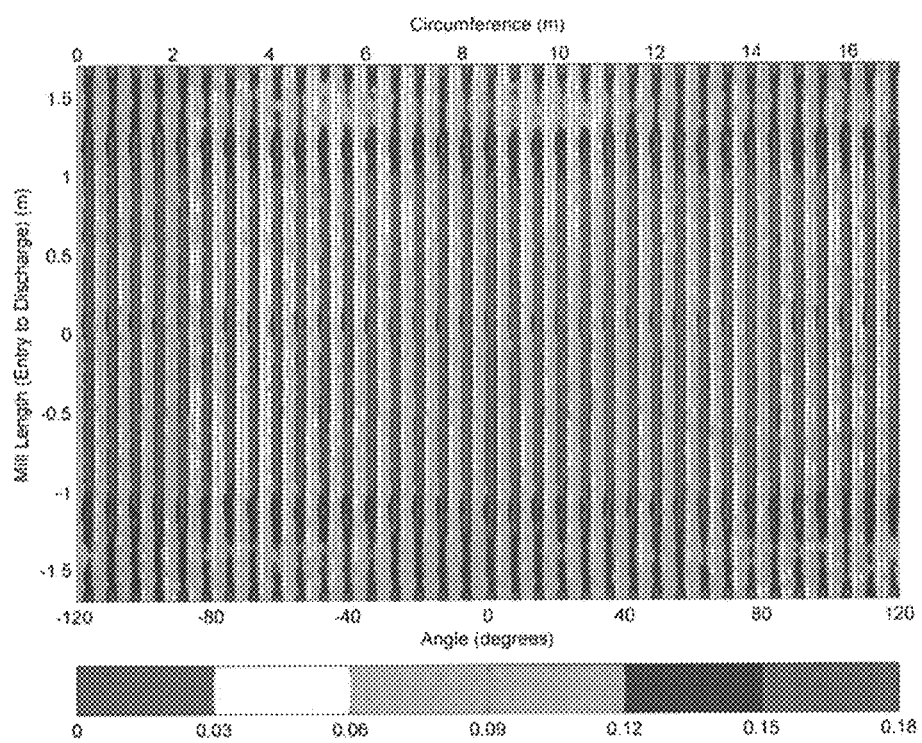
FIG. 8 shows an image of the unwrapped belly displacement data translated into a 2D grid with a legend showing the correspondence of the colours and shades used to liner thickness.
Figure 9:
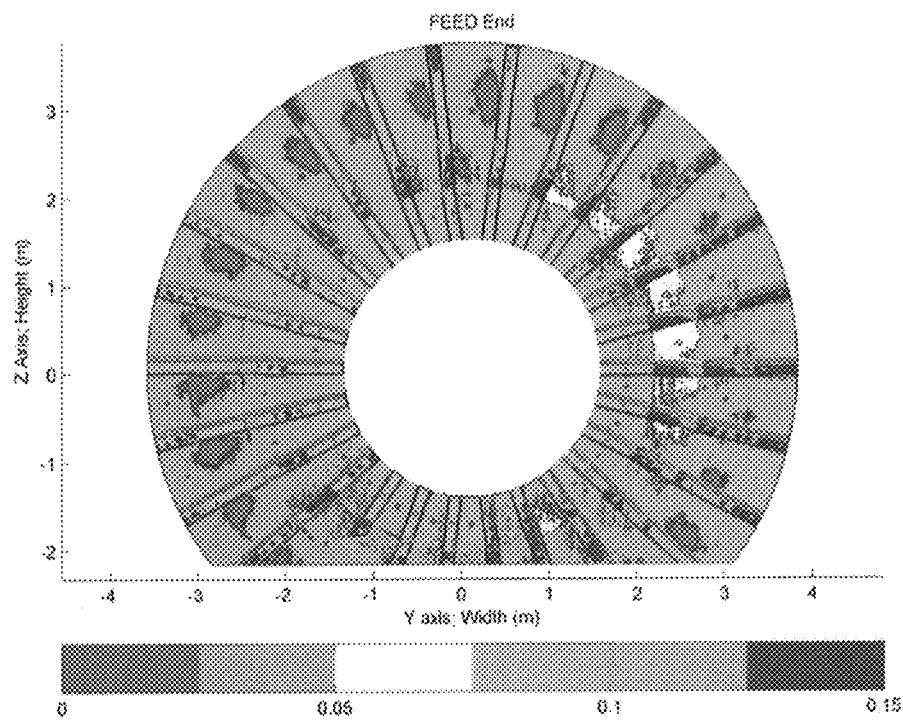
FIG. 9 is a 2D contour map of unwrapped displacement data for the feed end, similarly translated into a 2D grid with a legend showing relative liner thickness.
Figure 10:
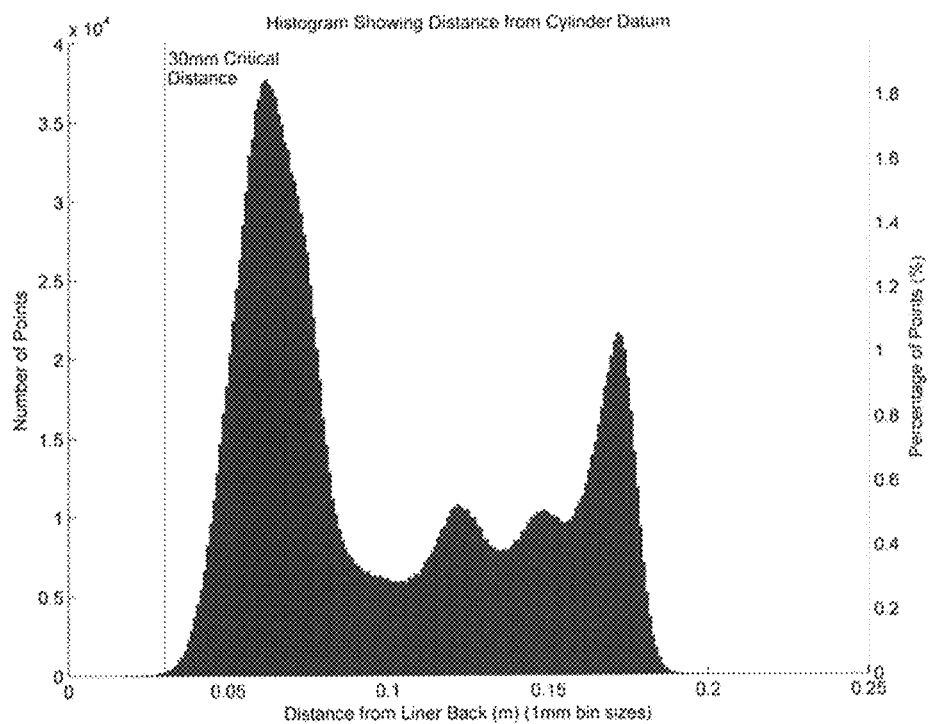
FIG. 10 is a histogram showing liner thickness from the cylinder data for all data scanned and the critical distance threshold.
Figure 11:
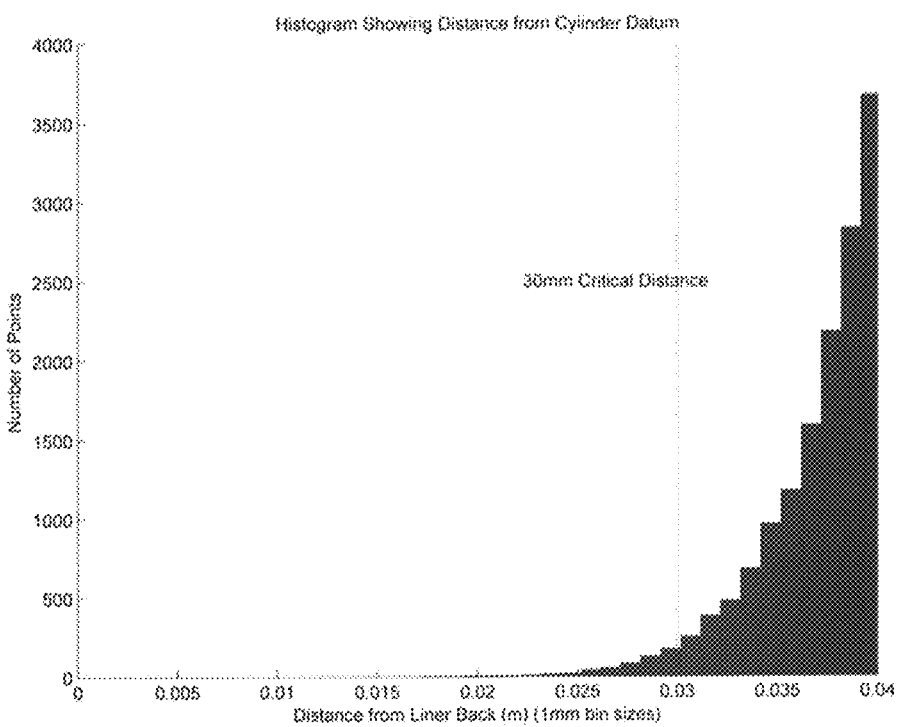
FIG. 11 is a histogram showing liner thickness from the cylinder data proximate to the prescribed critical distance threshold.
Figure 12:
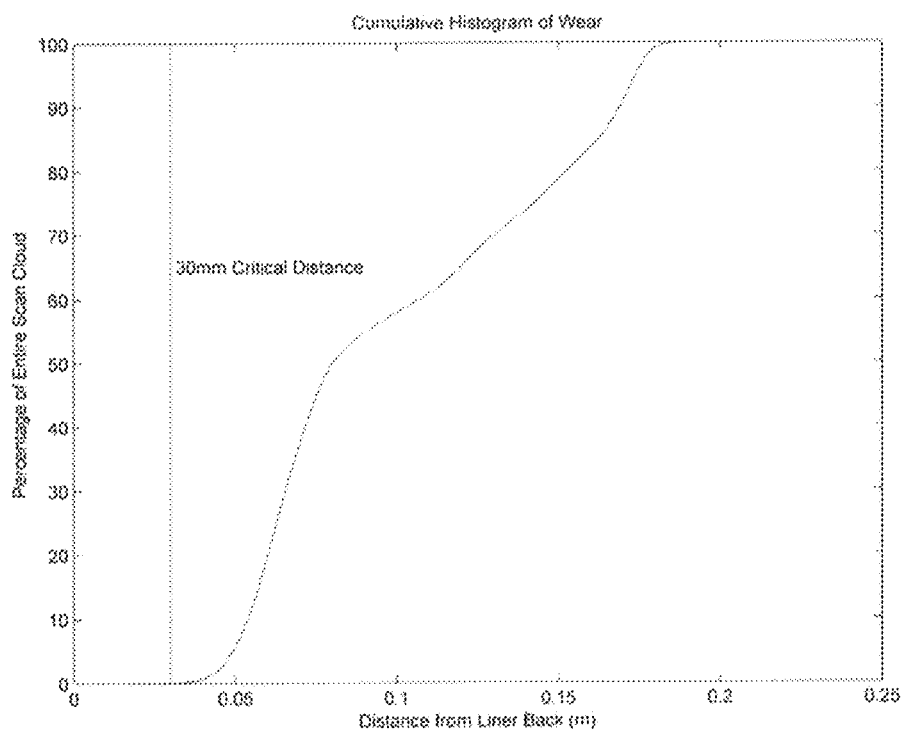
FIG. 12 is a cumulative histogram of liner wear corresponding to FIG. 10.
Figure 13:
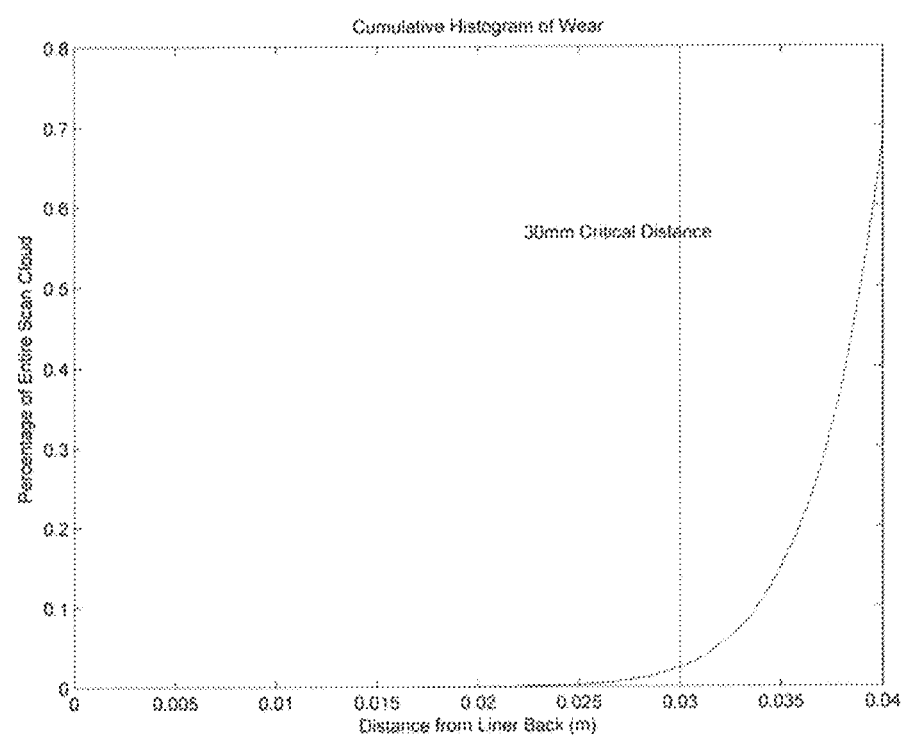
FIG. 13 is a cumulative histogram of liner wear corresponding to FIG. 11.
Figure 16:
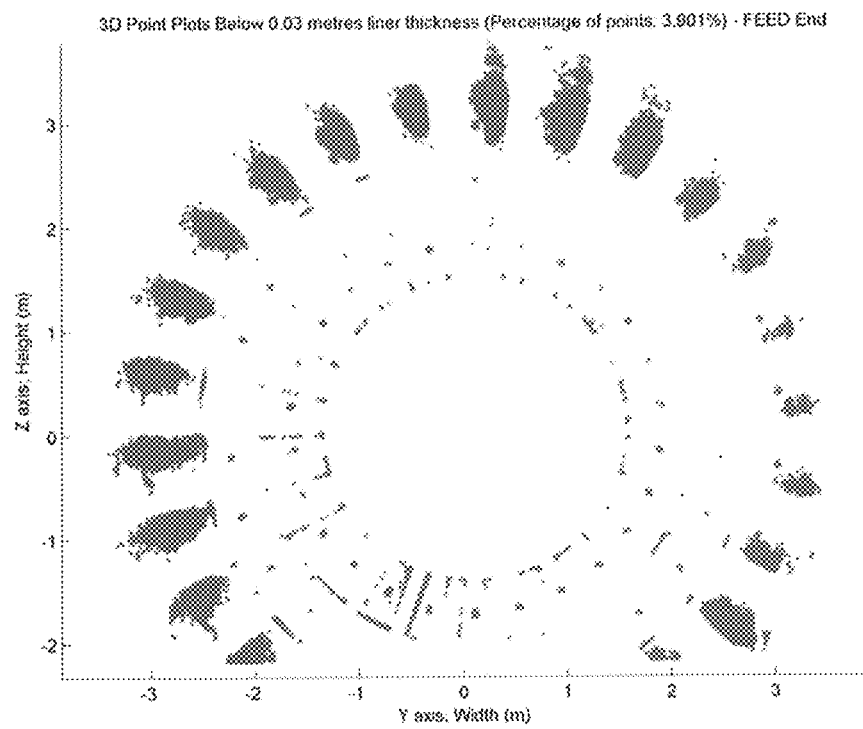
FIG. 16 is a plot of point data for the feed end which is below a prescribed thickness for the liner.
Figure 17:
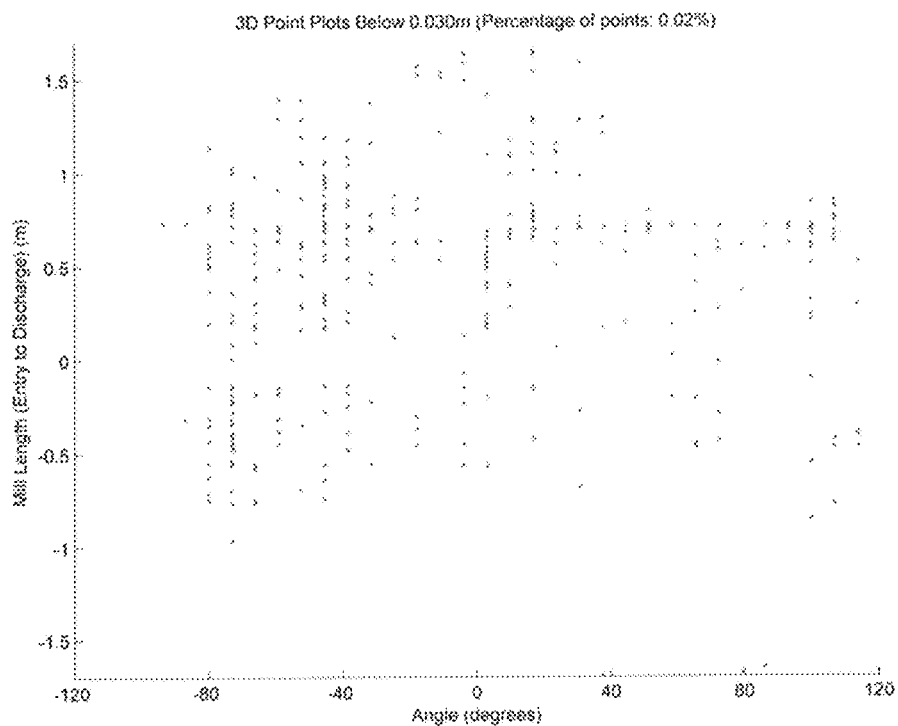
FIG. 17 is a similar plot to FIG. 16 but in relation to the belly.

The mapping means 65 includes data processing means, which in the present embodiment is in the form of the processing software 19, to obtain the point cloud data defining a surface in a co-ordinate system coinciding with the base reference and to generate displacement data in respect of the displacement between each point of the point cloud and a related point of said base reference in the manner previously described. The mapping means 65 also includes comparison means 67 to compare the displacement data against a prescribed threshold, which in the present embodiment is a critical distance from the back of the liner in order to gauge liner wear, eg. 30 mm, and display means 67 to graphically display the results of the scan and the comparison in the various formats. These formats comprise the following:

1. 3D surfaces of the liner surface and thickness for the belly and feed and discharge ends. An example of a 3D surface image of the liner segments for a portion of the belly and discharge end is shown in FIG. 6 and of the liner thickness is shown in FIG. 7.
2. Contour maps of the liner surface and thickness for the belly and feed and discharge ends. An example of contour maps of the liner thickness for the belly is shown in FIG. 8 and for, the feed end is shown in FIG. 9. Similar maps for the discharge end are derived in the same manner.
3. Histograms showing the frequency distribution of liner thickness relative to a prescribed thickness threshold for the belly and feed and discharge ends. An example of histograms showing the liner thickness for all points of a scan is shown in FIG. 10 and for a detailed view of the points around a critical threshold of 30 mm is shown in FIG. 11. The definition of the critical threshold varies with mill design and depends on a number of factors.
4. Cumulative histograms of liner thickness relative to the prescribed thickness threshold for the belly and feed and discharge ends. An example of cumulative histograms for the scans of FIGS. 10 and 11 are shown in FIGS. 12 and 13 respectively.
5. Plots of slices of data extracted from the mill ends along a circular path concentric with the cylinder axis. An example of a cross section through the feed end showing liner surface point cloud data along a circular path within a radius of 3.6 to 3.7 m is shown in FIG. 14, the relative location of which in a 3D scan is shown by the inner dark shaded ring 66 around the entry hole in FIG. 15, relative to the BOL reference plane. 68.
6. Plots of the points below predefined thickness threshold for the belly and feed and discharge ends. Examples of plots showing the location of points below a prescribed thickness for the feed end is shown in FIG. 16 and for the belly in FIG. 17.
7. Numerical output of the number and/or percentage of points below a predefined thickness threshold; mean liner thickness or other pertinent statistical liner information.

Figure 18:
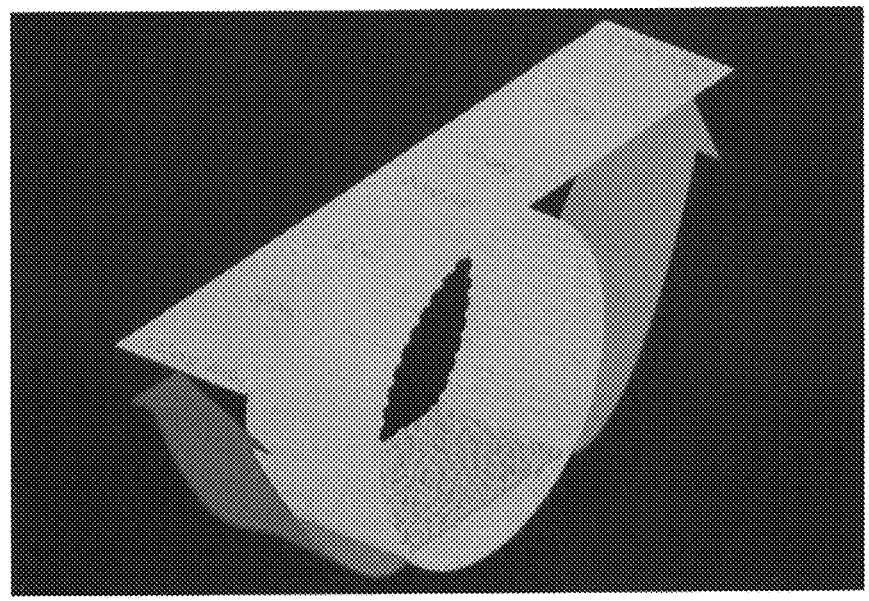
FIG. 18 is a 3D image showing how a circumferential section of belly data is unwrapped and represented in a two dimensional grid.

In the case of the second format for displaying contour maps of the point cloud data or displacement data, the display means 69 includes data manipulation means 71 for unwrapping the point cloud data and/or the displacement data onto a 2D plane for subsequent graphical display. A graphical representation showing the correlation between the 3D point cloud data and the unwrapped arrangement of such in 3D is shown in FIG. 18. The display means 69 also includes image visualisation means 73 to provide different colours or shades representing different magnitudes of displacement relative to the prescribed threshold on the contour maps, as shown in various of the preceding examples.

An example of a report that can be produced using the mapping means and selected formats for a particular mill is shown in the accompanying Appendix to this description, which is provided after FIG. 23 of the drawings.

Figure 19A:
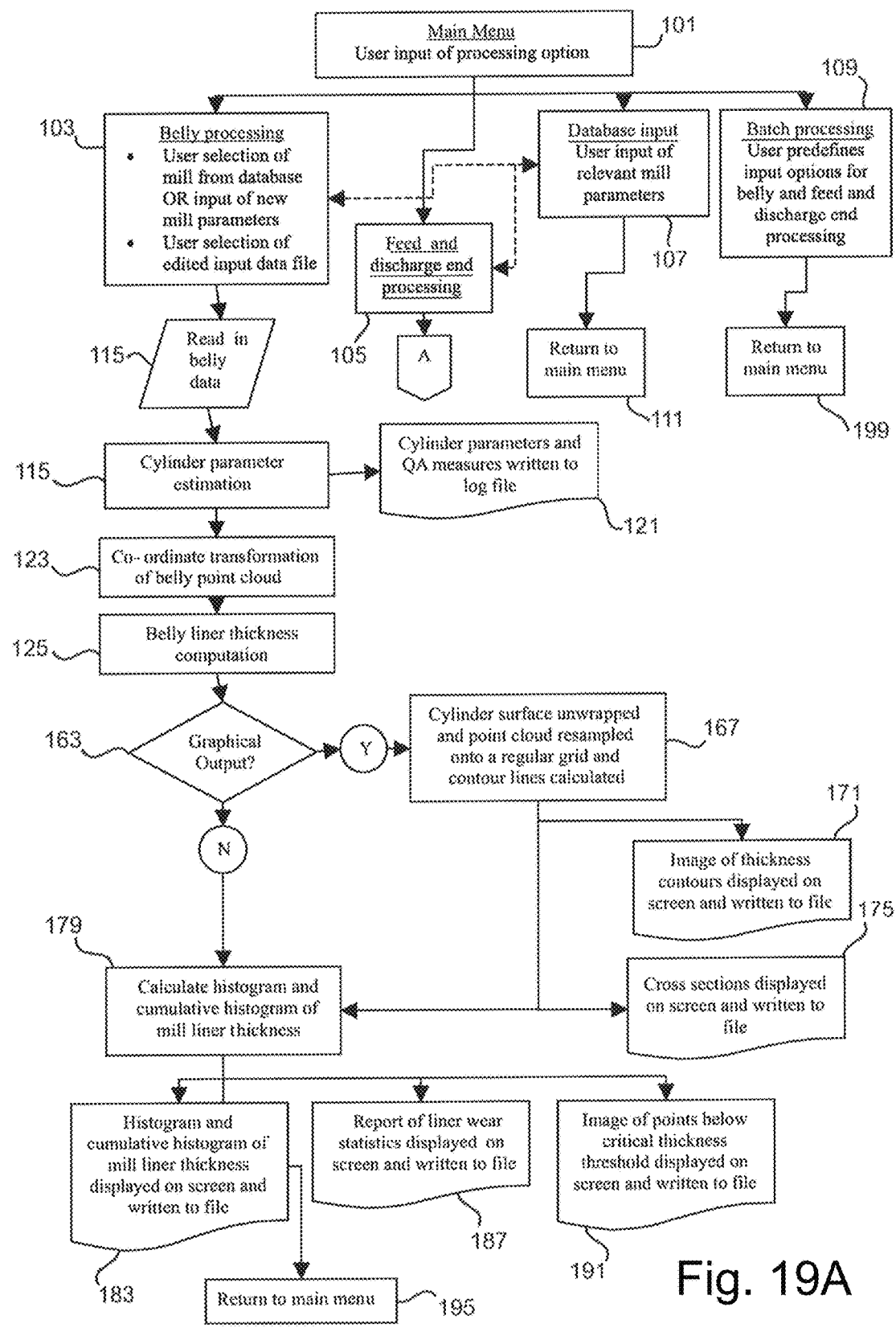
FIG. 19A to 19 C shows the main program flowchart for the software in accordance with the preferred embodiment.

The actual implementation and use of the processing software 19 in the present embodiment is best shown in the flowcharts of FIGS. 19 to 23, which will now be described in detail.

the main program flowchart for the processing software 19 is shown in FIGS. 19A. 19B and 19C of the drawings. A main menu 101 is designed to be presented to the user initially to provide various options for user input and choice of the particular processing options available. In the present embodiment, four principal processing options are provided comprising:

1. Belly processing 103
2. Feed and discharge end processing 105
3. Database input 107
4. Batch processing 109.

On invoking the belly processing option 103 the program enters a selection process to provide the user with two options, one to select the base reference data for the belly segment of a specific mill from the database 17, which, is designed to store historical base reference data for each mill that the system is used, and the other to input mill parameters as base reference data if the mill to be scanned is a new mill which has no previous base reference data recorded.

In the case of the latter, the program directs the user to the database input process 107, which invokes a routine to allow the user to input the relevant mill parameters to create new base reference for the particular mill concerned. This may simply involve loading a pre-existing data file comprising a CAD model of the mill, if such a data file exists, or creating a data file model of the mill from scratch by conducting a scan of the bare mill shell without the liners in place.

Once the data file is created via the database input processing option 107, it is stored amongst the other data files for other mills and is available for selection via the belly processing option or module 103 or feed and discharge end processing option 105.

After the database input 107 is completed, the program has a facility 111 to return the user to the main menu 101.

Figure 19B:
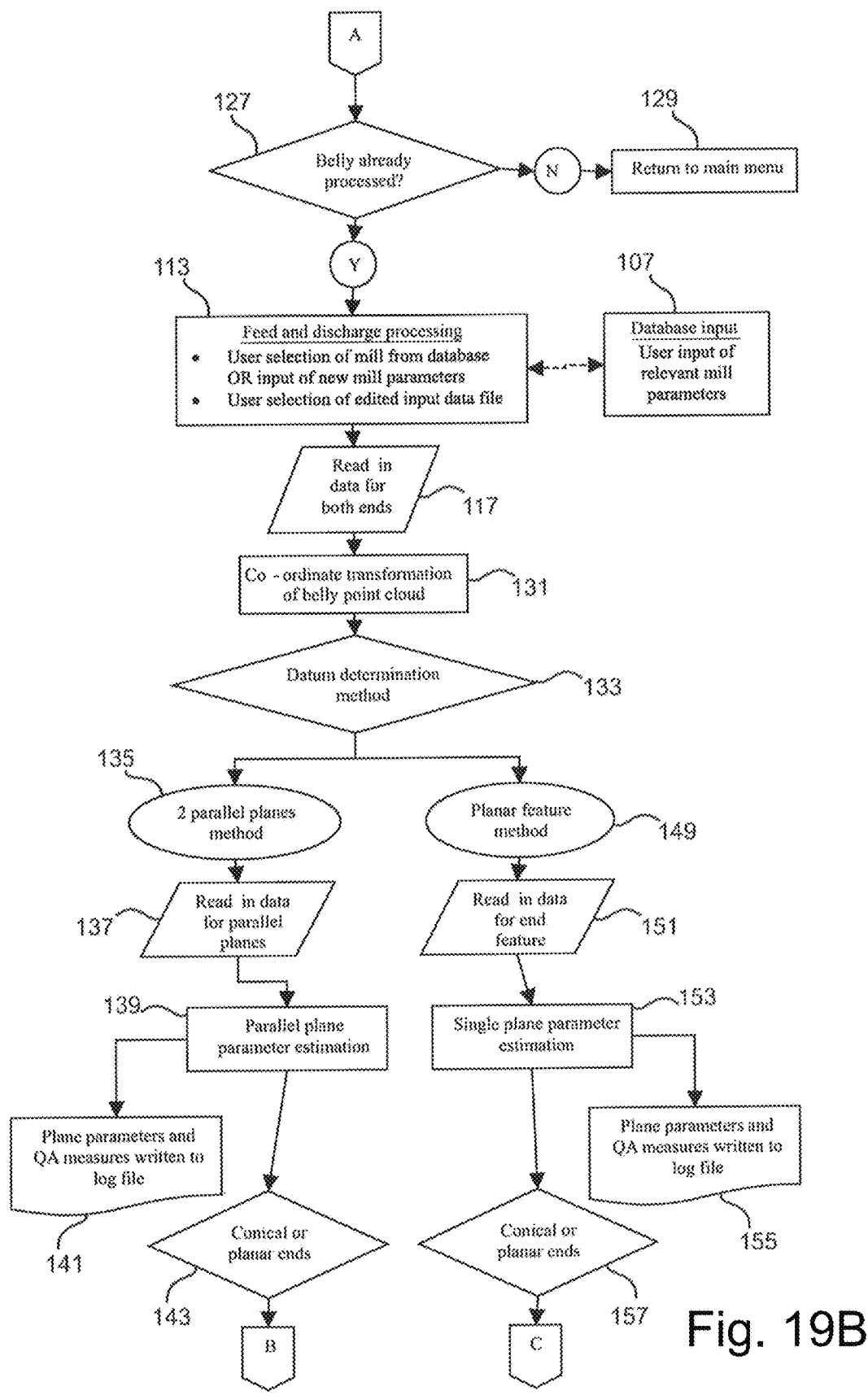

As shown in FIG. 19B, the feed and discharge end processing option 105 invokes a selection module 113 to provide the user with a set of options corresponding to those of the belly processing selection module 103; i.e. to select base reference data for the feed and discharge end segments of the particular mill from the database 17, or to input new mill parameters in the event that a data file of such for the particular mill is not stored on the database. In the case of the latter, the program similarly directs the user to the database input module 107, as in the case of the belly processing selection module 103.

In both the belly processing selection module 103 and the feed and discharge end processing selection module 113, on the user selecting an existing data file for a specific mill, an editable input data file is created in which to store point cloud data for the belly or feed and discharge ends derived from a scan of the particular mill with the liner segments in situ.

The program then advances to stage 115 of reading in belly data from the belly data segment of the point cloud data processed by the partitioning means 61 in the case of belly processing, or stage 117 of reading in feed and discharge end data from the feed and discharge end data segments of the point cloud data processed by the partitioning means 61 in the case of feed and discharge end processing.

For belly processing, after reading in the belly data at step 115, the referencing means 57 is operated by the program invoking an estimating routine 119 to estimate the key cylinder parameters from the point cloud data using the mathematical model previously described.

On completion of this, the program invokes another routine 121 to write the cylinder parameters derived from the mathematical model, as well as prescribed quality assurance (QA) measures, to a log file.

The referencing means 57 then attends to orientating the point cloud data relative to the base reference data by the program invoking a transformation routine 123 to transform the co-ordinate system of the point cloud data to the co-ordinate system of the base reference data using the transformation matrix previously described.

The displacement means 59 is then operated by the program proceeding with invoking a displacement routine 125 to calculate the belly liner thickness at each point of the re-orientated and transformed point cloud data using the mathematical equations previously described.

Figure 20:
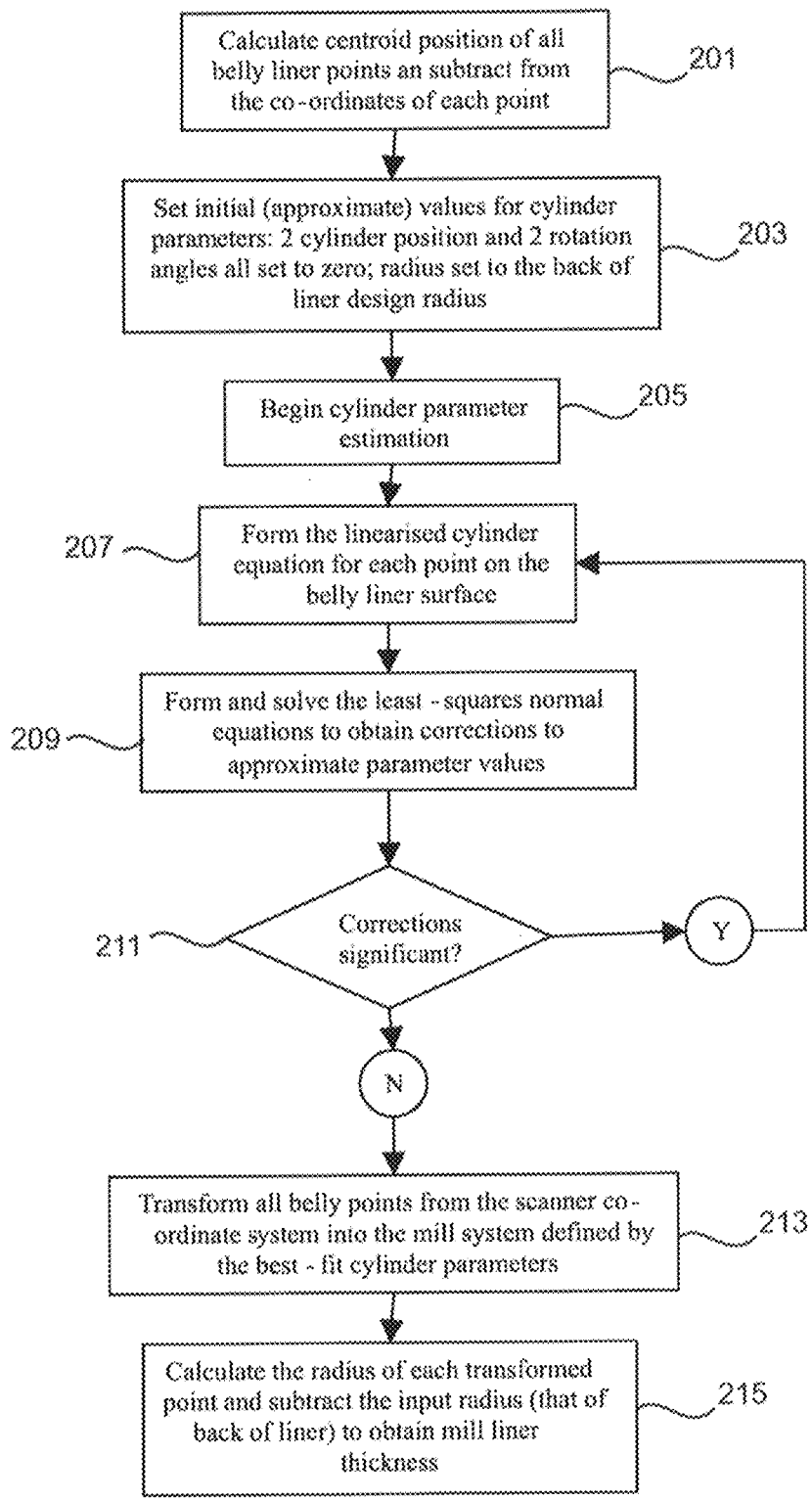
FIG. 20 is a more detailed flowchart showing the process steps for the cylinder parameter estimation module, the transformation module and the displacement module in the belly processing option.

A flowchart more particularly describing the process steps performed by the estimating routine 119, the transformation routine 123 and the displacement routine 125 is shown in FIG. 20 and will be described in more detail later.

For feed and discharge end processing, as shown in FIG. 19B, the program performs an initial check at step 127 to ascertain whether the belly has already been processed or not, prior to invoking the selection module 113. If not, the user is returned to the main menu at 129. If so, then the program permits the user to proceed to the selection module 113.

After reading in the feed and discharge end point cloud data at step 117, the referencing means 57 orientates the point cloud data relative to the base reference data of the feed and discharge ends by invoking the transformation module 131. This module uses the previously estimated transformation parameters and transforms the point cloud data to the co-ordinate system of base reference data using the mathematical models previously described.

The program then proceeds to the datum determination stage 133, where the datum for positioning the point cloud data segments for the feed and discharge ends relative to the BOL surface base reference data along the cylinder axis is determined by either of the two methods previously described, i.e. the gap point two parallel planes method or the planar feature method.

The particular method is predetermined for the particular mill by the user, and the program branches to the appropriate routine to be performed depending upon the particular parameter specified for such.

In the case of the two parallel planes method, the program branches to the start of this routine 135 and then invokes a read subroutine 137 to read in data for the feed end and discharge end, parallel planes.

Figure 21:
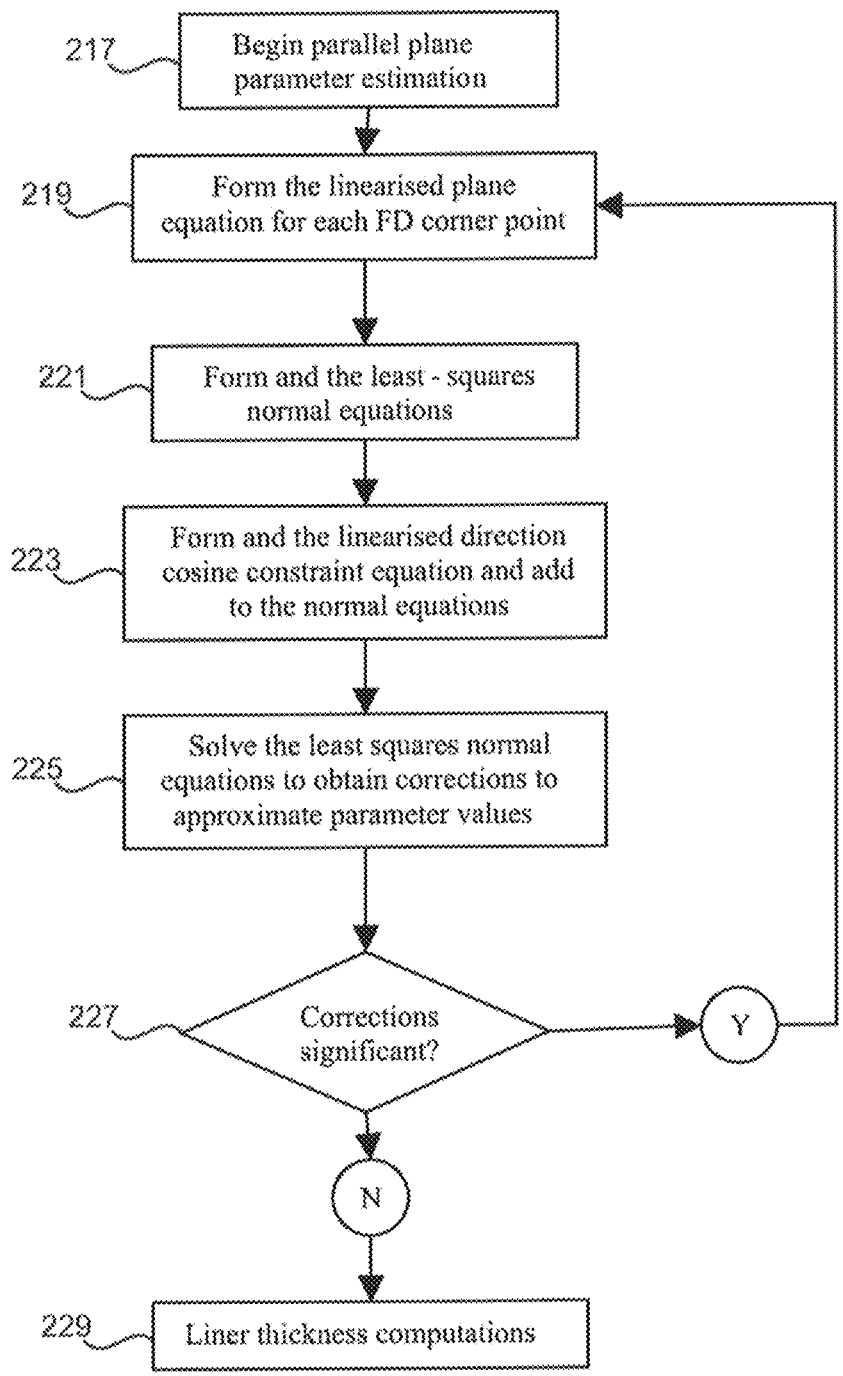
FIG. 21 is a more detailed flow chart showing the process steps for the parallel plane estimation module in the feed and discharge end processing option.

The program then invokes the requisite estimation module 139 for estimating the parallel plane parameters using the mathematical models previously described. The flowchart for the particular routine is shown in FIG. 21 and will be described in more detail later. A logging routine 141 is then invoked to write the derived plane parameters and prescribed QA measures to a log file.

Figure 19C:
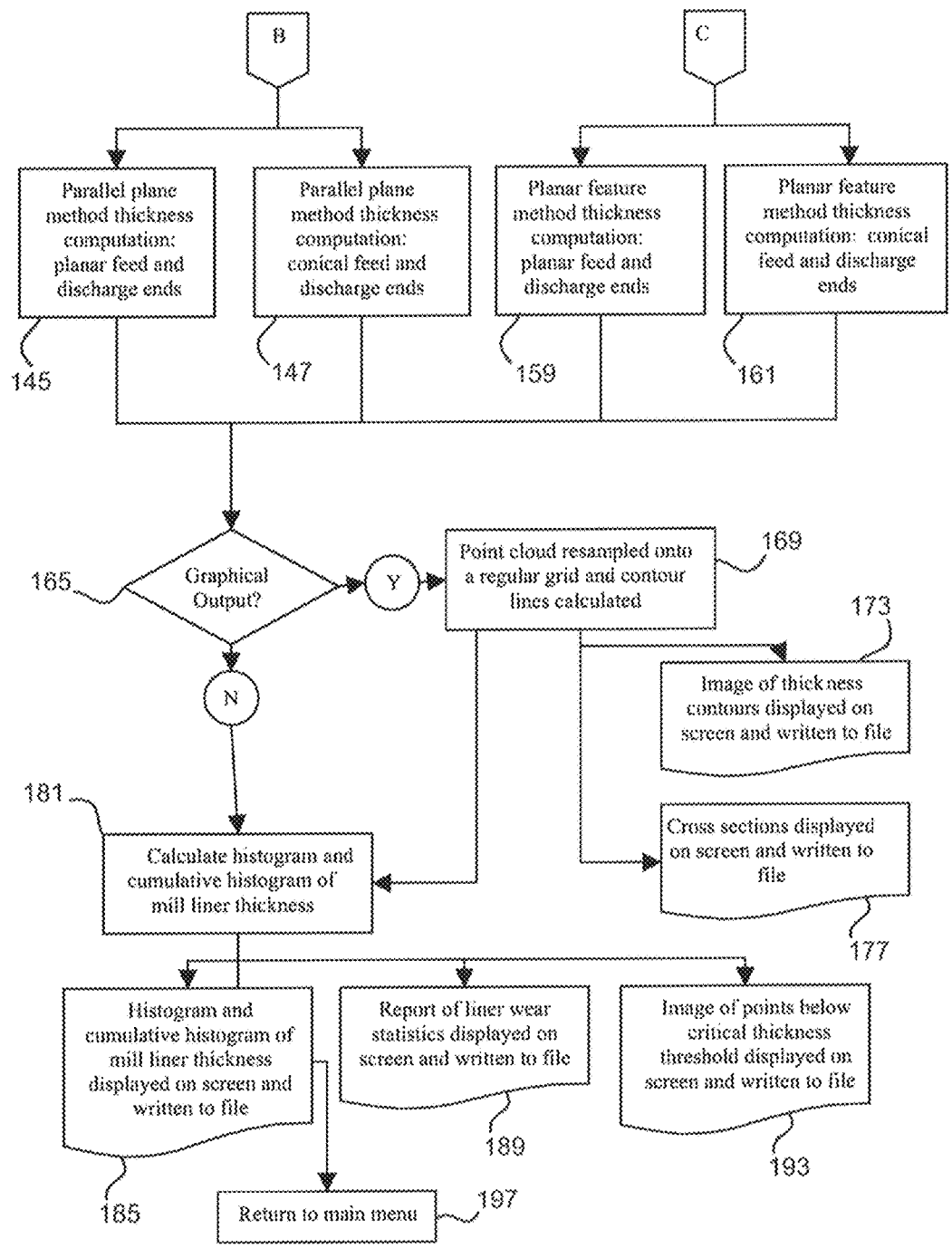

The program then reaches another decision point 143 to invoke the appropriate routine for computing the thickness of the liner using the parallel plane method according to whether the ends are planar or conical. The parameter determining which routine is processed constitutes part of the mill parameters prescribed for the mill, and results in the program invoking the planar end routine 145 or the conical end routine 147, as shown in FIG. 19C. These routines perform the thickness calculations as previously described for the displacement means 59, suitably modified for the particular design of mill end concerned.

In the case of the planar feature method, as shown in FIG. 19B, the program branches from the datum determination stage 133 to the start 149 of the planar feature routine and then invokes a read subroutine 151 to read in data for the ends and the planar feature or reference 63.

Figure 22:
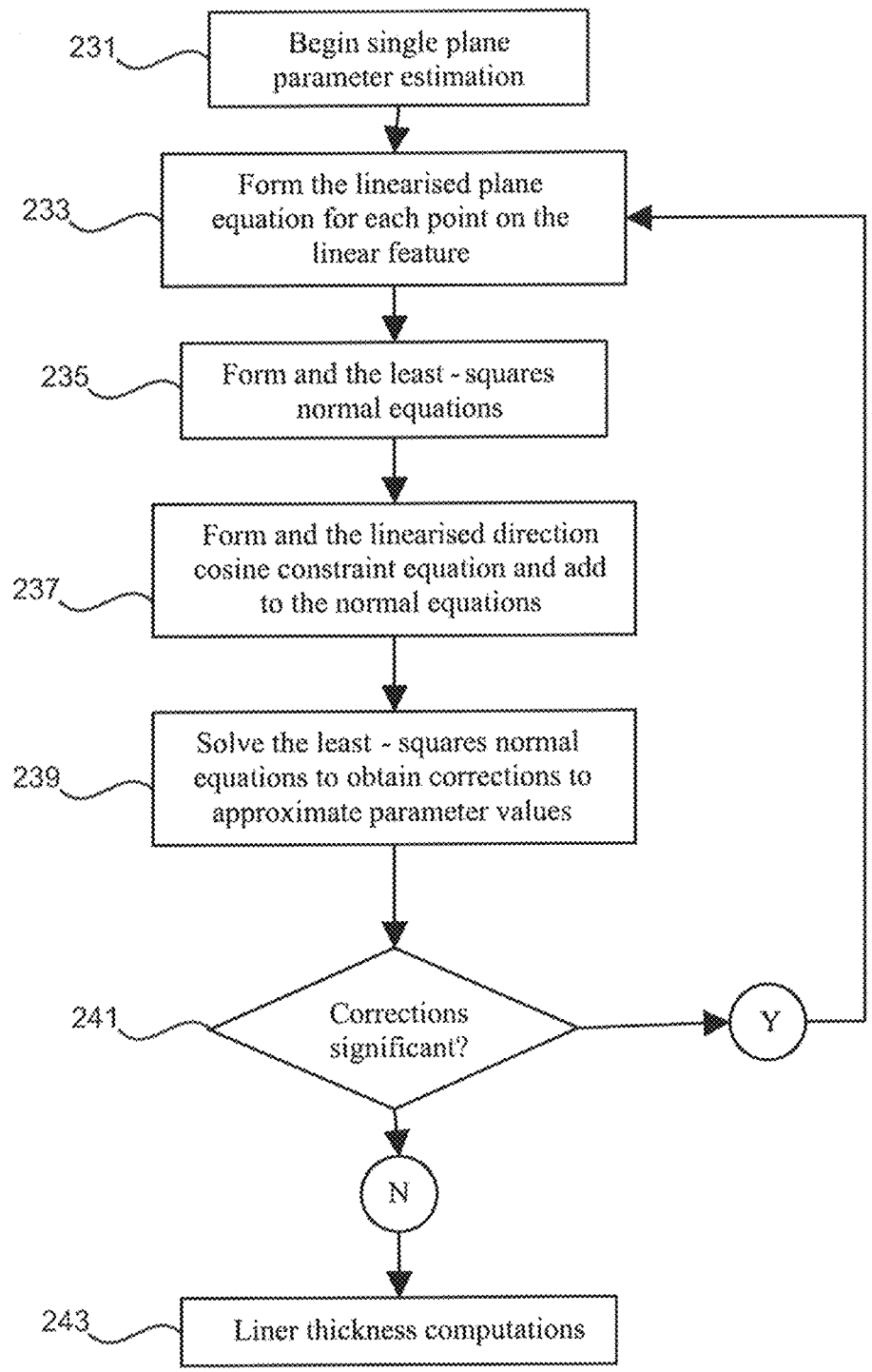
FIG. 22 is a more detailed flowchart showing the process steps for the single plane estimation module in the feed and discharge end processing option.

The program then invokes the requisite estimation module 153 for estimating the parameters of the single, best fit plane to determine the along-axis BOL distance to the feed and discharge ends using the mathematical models previously described. The flowchart for the particular routine is shown in FIG. 22 and will be described in more detail later. A logging routine 155 is then invoked to write the derived plane parameters and the prescribed QA measures to a log file.

Similar to the two parallel planes method, the program then reaches a decision point 157 to invoke the appropriate routine for computing the thickness of the liner using the planar feature method according to whether the ends are planar or conical. According to the parameter prescribed for the particular mill, the program proceeds with invoking either the planar end routine 159 or the conical end routine 161, as shown in FIG. 19C. These routines then perform the thickness calculations as previously described for the displacement means 59, suitably modified for the particular design of mill end concerned.

In both the belly processing and the feed and discharge end processing options 103 and 105, after completion of the mill liner thickness computations, the program proceeds to the reporting phase where the mill mapping means becomes operational. In both cases the program proceeds to a decision step 163 in the case of the belly processing option or decision step 165 in the case of the feed or discharge end processing option, to enquire as to whether graphical output is required to be reported. The answer to this query may either being included within the input parameters predefined for the particular mill and input via the batch processing option 109, or solicited directly from the user in real time.

In either case the program operates the display means to invoke a routine that generates and displays prescribed contour maps for the respective surface in response to an affirmative answer to the query, or simply calculates the histogram and cumulative histogram of the liner thickness in response to a negative answer to the query. In the case of an affirmative answer in the belly processing option, a belly mapping routine 167 is invoked and in the case of an affirmative answer to the feed and discharge end processing option, the end mapping routine 169 is invoked.

In the belly mapping routine 167, the data manipulation means operates to unwrap point cloud data in respect of the cylindrical shell surface and the point cloud resampled onto a regular 2D grid, where the contour lines are calculated. In the end mapping routine 169, the data manipulation means operates to similarly resample the point cloud data onto a regular 2D grid where the contour lines are similarly calculated.

Following calculation of the contour lines, in accordance with the second format, the image visualisation means invokes the image display routines 171 and 173, respectively, to graphically represent different magnitudes of contour thickness displacement relative to a prescribed threshold with different colours or shades.

The program provides for other routines to be optionally invoked for other formats, such as cross sections in routines 175 and 177, as well as the histogram routines 179 and 181 for calculating the mill liner thickness. In addition to displaying the requisite images on the screen, the data in respect thereof is also written to the file for the particular mill and stored on the database 17 for subsequent access.

In the case of the histograms, these are also displayed, in accordance with the third and fourth formats by the routines 183 and 185, and invoked directly by the program in response to a negative answer to the decision steps 163 and 165 respectively.

Further routines are invoked for reporting liner wear statistics 187 and 189 and images of points below the critical thickness threshold 191 and 193. In both cases these are similarly displayed and written to a file for storing within the database.

Following calculation and display of all of the selected reports for either the belly processing option or the feed and discharge end processing option, the program returns to the main menu at steps 195 and 197 respectively.

The batch processing option 109 follows a routine whereby the user is provided with a facility for predefining input options for both belly processing and feed and discharge end processing options to run automatically in a batch mode. On completion of the batch processing module, the program provides the facility 199 to return to the main menu to proceed with one of the remaining options.

The specific processes performed by the estimating routine 117, the transformation routine 123 and the displacement routine 125 for the belly processing option, will now be described in relation to FIG. 20 in more detail.

Firstly, with respect to the estimating routine 119, the cylinder parameter estimation proceeds at step 201 with initially calculating the centroid position of all of the liner points from the point cloud data derived from the data editing means and subtracting this position from the coordinates of each point. The purpose of this is to essentially determine the central axis of the shell relative to the coordinate system of the point cloud of data, whereby the reference point used by the laser scanner and the accumulated surface data is normally distant from the centroid position both with respect to its radial and axial position relative to the true central axis of the cylindrical shell.

The process then proceeds at 203 to set initial approximate values for the cylinder parameters, whereby two cylinder positions and two rotation angles are all set to zero, and the radius is set to the BOL radius, which is one of the key parameters obtained from the base reference data for the mill. The cylinder parameter estimation then commences as an iterative process at 205.

The iterative process initially involves forming the linearised cylinder equation for each point on the belly liner surface at 207; then forming and solving the least-squares normal equation to obtain corrections to approximate parameter values at 209; and finally deciding whether the corrections are significant at 211. If the corrections are significant, then the provisionally set values for the cylinder parameters are adjusted incrementally a prescribed amount from zero and the process steps 207 to 211 are performed again to determine whether the corrections are again significant. This iteration continues until the query at 211 determines that the corrections are not significant and fall within the prescribed tolerance, at which time the selected cylinder parameters are determined to be correct for the shell.

The transformation routine 123 is then commenced and performed at step 213, where all belly points from the point cloud data in the scanner coordinate system are transformed into the coordinate system of the base reference data of the mill using the best fit cylinder parameters previously estimated.

On completing this transformation the belly liner thickness computation is performed by the displacement routine 125 at step 215, whereby the radius of each transformed point is calculated and subtracted from the prescribed BOL radius to obtain mill liner thickness at that point relative to the base reference.

The specific process for the parallel plane parameter estimation module 113 will now be described in relation to FIG. 21 in more detail.

As shown, the parallel plane parameter estimation process commences at 217 and proceeds with an iterative process commencing at 219, whereby the linearised plane equation for each FD corner point is initially formed. The process then proceeds with forming the least-squares normal equations at 221. Thereafter, at step 223, the linearised direction cosine constraint equation is formed and added to the normal equations formed at step 221.

The least-squares normal equations are then solved at 225 to obtain corrections to approximate parameter values. These corrections are then checked against standard convergence tolerance parameters to determine whether they are numerically significant at step 227; and if so, the FD corner point values are adjusted and steps 219 to 227 are repeated again to determine whether the corrections are significant. When the corrections are determined not to be significant, at which point the FD corner points are deemed to align with the true central axis of the cylindrical shell, the minor thickness computations are then attended to for each end at 229.

The specific process performed by the single plane parameter estimation module 153 will now be described in relation to FIG. 22 in more detail.

As shown, the single plane parameter estimation process begins at step 231, and as in the parallel plane estimation process, iteration commences at 233, whereby the linearised plane equation for each point on the planar feature or reference 63 is formed.

The least-squares normal equations are then formed at 235, followed by the linearised direction cosine constraint equation at 237, which is added to the normal equations formed at 235.

The least-squares normal equations are then solved at 239 to obtain corrections to approximate parameter values.

The corrections are then compared at 241 against standard convergence tolerance parameters. If the corrections are numerically significant then an adjustment is made to the estimated position of the planar feature and the process steps 233 to 241 are repeated to determine whether the corrections are still significant or not.

This iteration continues until the corrections are deemed not to be significant, falling within the prescribed tolerance, whereupon the estimated position of the planar feature is deemed to be correctly aligned with the base reference data of the mill. Thereafter, the process proceeds with computing the liner thickness at step 243.

Figure 23A:
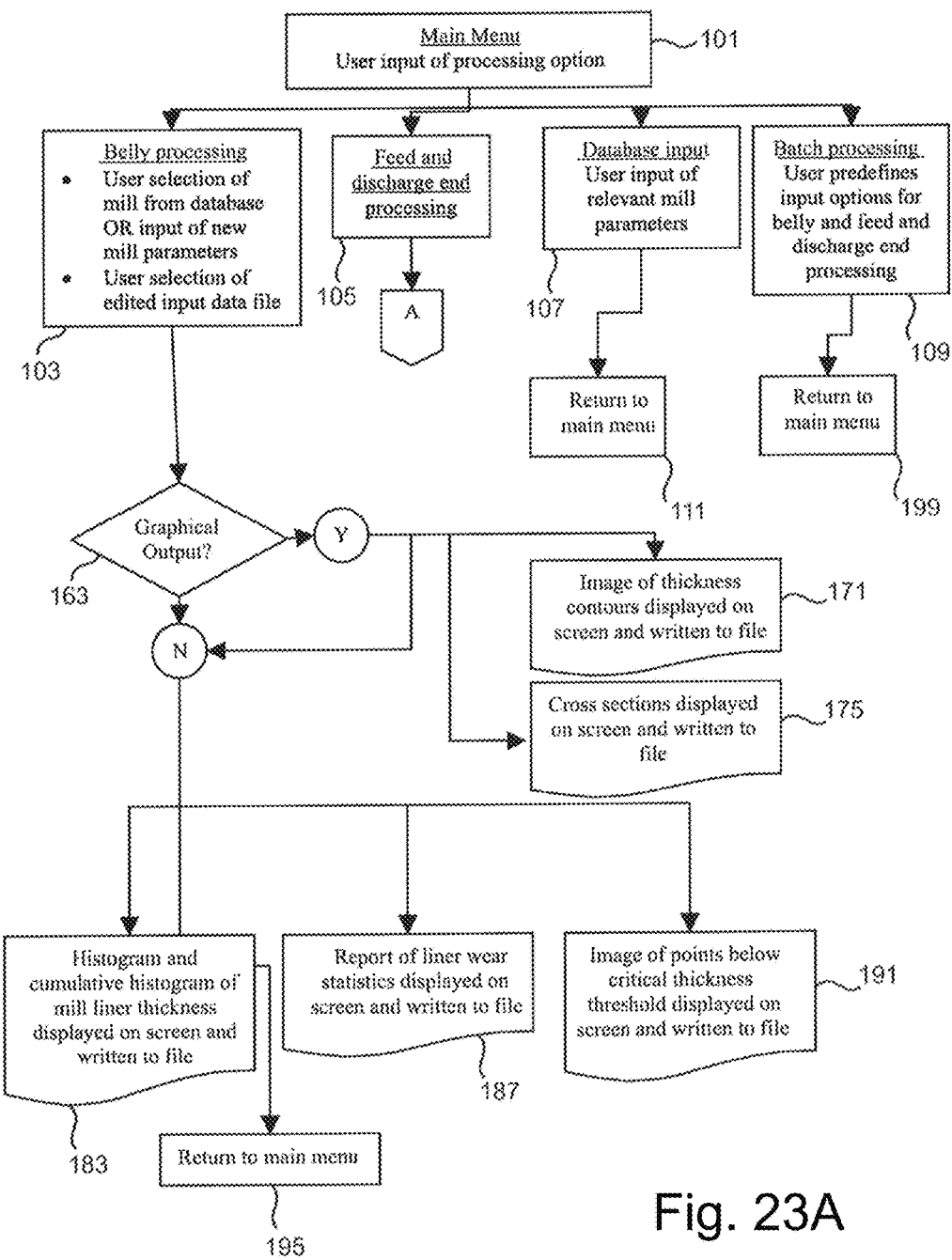
FIGS. 23A and 23B show the flowchart for user operation of the software.
Figure 23B:
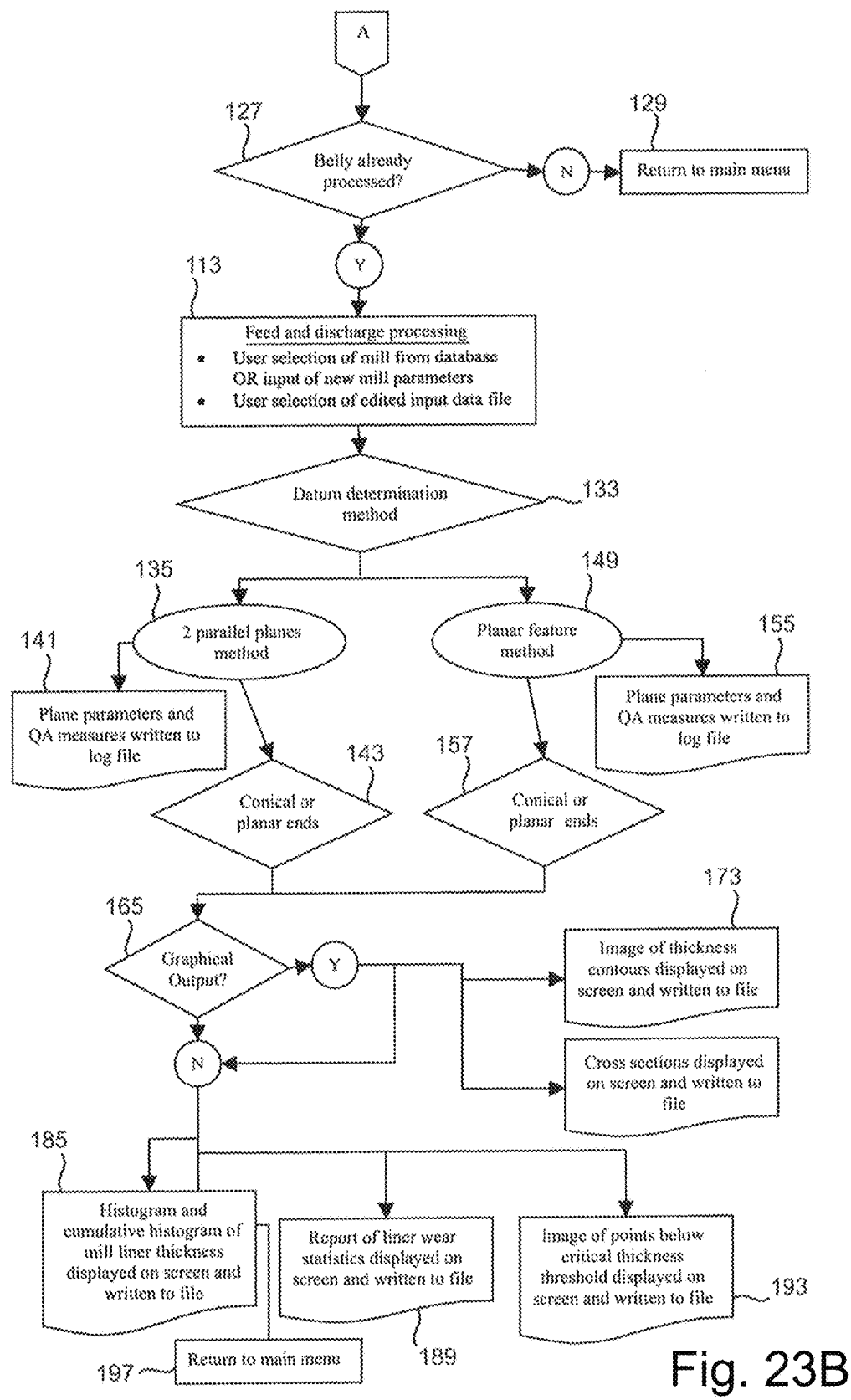

The user operation flowchart is shown in FIGS. 23A and 23B and is substantially the same as the program flowchart. Accordingly corresponding reference numerals are used to identify corresponding routines and modules described in relation to the program flowchart.

The present embodiment has several advantages over prior art systems used for inspecting mill liner wear. Some of these advantages are as follows:

1. Unlike visual inspection and ultrasonic thickness gauging, the invention does not require physical human access into a cylindrical mill, thus saving shutdown time and avoiding the complexity of safety issues (the inside of a cylindrical mill is a dangerous environment and it may be necessary to wait several hours after shutdown before it is safe for human access).
2. Data collection takes less than 5 minutes, which is much faster than any alternative method of inspection.
3. Several million point samples of liner thickness are computed, rather than a few dozen. Virtually the entire visible mill surface can be measured.
4. The relative location of all point samples is known precisely relative to the mill axis. The other methods do not deliver this information.
5. The individual precision of measurements is empirically more accurate than other techniques because of the problems involved with capturing measurements orthogonal to the BOL surface. Furthermore, the heated conditions inside a mill, ultrasonic thickness gauging is very susceptible to errors in the estimated speed of sound within the liner.
6. A 3D digital mill liner wear model is computed directly from the point cloud data, as are quality control indicators and associated statistical analysis. No other method provides such detailed scientifically rigorous information about the thickness of a mill liner.
7. Mill linear wear is visualised by a series of colour-coded maps for the central shell and the feed and discharge ends. The other methods cannot provide this type of visualisation.

It should be appreciated that the scope of the present invention is not limited to the specific embodiment described herein. Importantly, the invention is not limited to mapping and measuring thickness of mill liners in any of the available mill types. Indeed, other embodiments may be envisaged using the same principles applied to mapping and/or measuring surface displacement relative to a reference in other applications such as vessels and structures particularly common to industrial installations.

The invention claimed is:

1. A system to determine wear of a first surface of a mill and the displacement of the first surface relative to a base reference comprising a second surface of the mill, the first surface being exposed to wear and the second surface not exposed to wear, wherein said second surface is oriented with reference to a mill co-ordinate system related to the geometry of the mill, said system comprising:

a scanning means comprising a laser scanner comprising a distance measuring unit configured to transmit laser radiation towards the first surface and to measure a distance between the laser scanner and the first surface to generate point cloud data, the point cloud data comprising a plurality of three-dimensional spatial points in respect of a measure of the spatial orientation of a distal surface comprising the first surface and oriented with respect to a point cloud co-ordinate system referenced to a reference point of the laser scanner, each of the plurality of spatial points being relative to a corresponding spatial point relative to a reference point located on said second surface, the generated point cloud data defining a three-dimensional point cloud image of said first surface;

a storage means for storing base reference data in respect of the spatial orientation of the second surface relative to said first surface; and a processing means comprising microprocessor circuitry interfaced with the scanning means and the storage means for processing said three-dimensional point cloud image and said base reference data to determine the relative displacement of said first surface with respect to said second surface, wherein said processing means includes:
a partitioning means for partitioning said point cloud data into discrete segments corresponding to different geometrically described sections of said first surface;
a referencing means to orientate said three-dimensional point cloud image relative to key reference data of the base reference and to transform said point cloud co-ordinate system of the three-dimensional point cloud image into a co-ordinate system coinciding with said mill co-ordinate system of said base reference data of said second surface,
a displacement processing means to calculate the displacement between said first surface and said second surface using both sets of data in said co-ordinate system, wherein the calculated displacement is compared against a prescribed threshold comprising a critical distance between said first surface and said second surface in order to gauge wear of said first surface relative to said second surface.

2. A system as claimed in claim 1, wherein said key reference data are the critical parameters that describe the geometry of the base reference and boundaries of the first surface.

3. A system as claimed in claim 2, wherein said second surface is the inner surface of a mill defined by a cylindrical shell with opposing ends and said critical parameters include:
the location of the central longitudinal axis of the shell;
the radius of the shell; and
the length of the cylindrical portion of the shell.

4. A system as claimed in claim 3, wherein the first surface comprises segments and said critical parameters include the distance of the corner points of each said segment to one end of said shell.

5. A system as claimed in claim 4, wherein said critical parameters include the distance between a prescribed reference surface and one of the opposing ends of the shell.

6. A system as claimed in claim 4, wherein the opposing ends are conical, and said critical parameters include:
the cone angles of said opposing ends, relative to the axis of the cylindrical shell; and
the distance between the apexes of the opposing ends.

7. A system as claimed in claim 4, wherein said processing means further includes a partitioning means for partitioning said point cloud data into discrete segments corresponding to different geometrically described sections of said first surface before operation of said referencing means and said displacement processing means.

8. A system as claimed in claim 7, wherein said referencing means includes a positioning means for positioning the point cloud data segments that were discretely partitioned and stored for the opposing ends of the cylindrical shell, relative to said base reference.

9. A system as claimed in claim 8, wherein said positioning means enables:
extracting data pertaining to the distance of the corner points from said point cloud data to determine the location of the corner points (A), the length of the segments (B), the gap between an adjacent segment and the one opposing end of the shell (C), and the longitudinal extent of the shell (D); and
translating the data along the longitudinal axis by:
determining the location of all corners within one vertical plane of visible segments all around the shell;
determining the location of gaps between all corners opposing the determined location of all corners within one vertical plane of visible segments all around the shell;
determining the halfway plane between planes through points extracted from the determined location of all corners and the determined location of gaps between all corners;
determining the position of the base reference at the one opposing end according to a formula: $\frac{1}{4}A+B+C$; and
determining the position of the base reference at the other opposing end by adding D to the outcome of the formula for determining the position of the base reference.

10. A system as claimed in claim 8, wherein said critical parameters include the distance between a prescribed reference surface and one of the opposing ends of the shell, wherein said positioning means enables:
extracting data pertaining to the distance between the prescribed reference surface and the one of the opposing ends of the shell (A'), and the longitudinal extent of the shell (D') from the base reference data; and
translating the data along the longitudinal axis by:
determining the position of the base reference at the one opposing end by adding A' to the location of the reference surface in said point cloud data; and
determining the position of the base reference at the other opposing end by adding D to the determined position of the base reference.

11. A system as claimed in claim 8, wherein said referencing means enables invoking an estimating means for estimating the critical parameters for said displacement processing means to subsequently determine the thickness of the distal surface relative to the base reference at the opposing ends of the cylindrical shell.

12. A system as claimed in claim 11, wherein said positioning means enables:
extracting data pertaining to the distance of the corner points from said point cloud data to determine the location of the corner points (A), the length of the segments (B), the gap between an adjacent segment and the one opposing end of the shell (C), and the longitudinal extent of the shell (D); and
translating the data along the longitudinal axis by:
determining the location of all corners within one vertical plane of visible segments all around the shell;
determining the location of gaps between all corners opposing the determined locations of all corners within one vertical plane of visible segments all around the shell;
determining the halfway plane between planes through points extracted from the determined location of all corners and the determined location of gaps between all corners;
determining the position of the base reference at the one opposing end according to a formula: $\frac{1}{2}A+B+C$; and
determining the position of the base reference at the other opposing end by adding D to the outcome of the formula for determining the position of the base reference;
and said estimating means uses a gap point two parallel planes method for adopting a simultaneous least squares fit methodology, whereby the loci of the corner points are used to estimate the parameters of the parallel, best-fit planes in order to determine the distance along the longitudinal axis to the base reference at both of the opposing ends of the cylindrical shell.

13. A system as claimed in claim 12, wherein said referencing means includes an orientating process to apply a functional model to orientate said point cloud data relative to said key reference data of the opposing ends and to transform said point cloud data into a co-ordinate system coinciding with said base reference data for each opposing end, respectively.

14. A system as claimed in claim 13, wherein the case of the opposing ends is planar or conical, said displacement processing means enables calculating the displacement between the distal surface and the base reference using both sets of data in the co-ordinate system of the base reference data, said point cloud data being already transformed, commencing with the one end and then the other.

15. A system as claimed in claim 11, wherein said estimating means uses a planar reference surface method for adopting a simultaneous least squares fit methodology, whereby the reference surface is planar and data points thereon at the time of acquisition that are positioned by said positioning means and transformed by a transformation means are used to estimate the parameters of a best-fit plane in order to determine the distance along the longitudinal axis to the base reference at both of the opposing ends of the cylindrical shell.

16. A system as claimed in claim 4, wherein said displacement processing means enables calculating the radius being the orthogonal distance from the axis of the cylindrical shell to a specific observation point and determines the thickness of the distal surface relative to the base reference at said specific observation point along the cylindrical shell as the difference between the initial approximate radius of the base reference and the calculated radius.

17. A system as claimed in claim 3, wherein said at least one of the critical parameters of said key reference data is the axis of the cylindrical shell.

18. A system as claimed in claim 17, wherein said processing means includes a data editing means for filtering spurious point data from the accumulated point cloud data before operation of said referencing means and said displacement processing means.

19. A system as claimed in claim 1, including processing modules to provide for statistical analysis and quality control of the accumulated cloud point data, said processing modules comprising one or more of the following metrics:
covariance matrix of estimated parameters;
data snooping methods to test and identify least-squares residuals and subsequently remove outlier points;
root mean square (RMS) and maximum residual; and
estimated variance factor.

20. A system as claimed in claim 1, wherein said referencing means includes a locating means for locating at least one of the critical parameters of said key reference data within said point cloud data, and a transformation means for transforming the point cloud data into the co-ordinate system coinciding with said base reference data so that the location of the one critical parameter mathematically coincides with the location of this same critical parameter in the base reference data.

21. A system as claimed in claim 20, wherein said locating means includes an estimating means for estimating the location of at least one of the critical parameters of said key reference data from said point cloud data.

22. A computer-based method for measuring the wear of a first surface of a structure relative to a base reference comprising a second surface of the structure, wherein the second surface is not exposed to wear, and wherein said second surface is oriented with reference to a structure co-ordinate system related to the geometry of the structure, said method comprising:
generating, using a laser scanner including a distance measuring unit configured to transmit laser radiation towards the first surface and to measure a distance between the laser scanner and the first surface, point cloud data comprising a plurality of three-dimensional spatial points in respect of a measure of the spatial orientation of a distal surface relative to a reference point, the point cloud data defining a three dimensional image of said first surface oriented with respect to a point cloud co-ordinate system referenced to the reference point of the laser scanner, each of the plurality of spatial points being relative to a corresponding spatial point relative to a reference point located on said second surface;
obtaining base reference data in a prescribed co-ordinate system in respect of the second surface relative to said first surface;
determining the location and direction of key reference data of the base reference;
processing, using a computer comprising microprocessor circuitry interfaced with the laser scanner and storage means, said point cloud data and said base reference data to determine a relative displacement of said first surface with respect to said second surface, said processing comprising:
partitioning said point cloud data into discrete segments corresponding to different geometrically described sections of said first surface;
orientating the point cloud data relative to the key reference data defined by said base reference data and transforming the point cloud co-ordinate system of the three-dimensional point cloud image into a co-ordinate system coinciding with said base reference data; and
determining the relative displacement of said first surface defined by said point cloud data with respect to said base reference in said co-ordinate system, wherein the relative displacement is compared against a prescribed threshold comprising a critical distance between said first surface and said second surface in order to gauge wear of said first surface relative to said second surface.

23. A system for mapping the displacement of a first surface of a structure relative to a base reference comprising a second surface of the structure, the first surface being subject to wear, wherein said second surface is oriented with reference to a structure co-ordinate system related to the geometry of the structure, said system comprising:
a laser scanner comprising a distance measuring unit configured to transmit laser radiation towards the first surface and to measure a distance between the laser scanner and the first surface to generate point cloud data, the point cloud data comprising a plurality of three-dimensional spatial points defining the first surface, oriented with respect to a point cloud co-ordinate system referenced to a reference point of the laser scanner, each of the plurality of spatial points being relative to a corresponding spatial point relative to a reference point located on said second surface;
a processing means comprising microprocessor circuitry interfaced with the laser scanner for partitioning said point cloud data into discrete segments corresponding to different geometrically described sections of said first surface and orientating the point cloud data relative to base reference data and transforming the point cloud co-ordinate system into said structure co-ordinate system coinciding with the base reference and to generate displacement data in respect of the displacement between each point of said point cloud and a related point of said base reference;

a comparison means for comparing the displacement data against a prescribed threshold comprising a critical distance between said first surface and said second surface in order to gauge wear of said first surface relative to said second surface; and a display means for graphically displaying the result of the comparison, wherein the displacement data exceeding the prescribed threshold indicates the first surface requires one of maintenance or replacement.

24. A system to measure the displacement of a first surface of a structure relative to a base reference comprising a second surface of the structure, the first surface being subject to wear, wherein said second surface is oriented with reference to a structure co-ordinate system related to the geometry of the structure, said system comprising:

a laser scanner comprising a distance measuring unit configured to transmit laser radiation towards the first surface and to measure a distance between the laser scanner and the first surface to generate point cloud data, the point cloud data comprising a plurality of three-dimensional spatial points in respect of a measure of the spatial orientation of a distal surface relative to a reference point, the generated point cloud data defining a three-dimensional image of said first surface oriented with respect to a point cloud co-ordinate system referenced to the reference point of the laser scanner, each of the plurality of spatial points being relative to a corresponding spatial point relative to a reference point located on said second surface;

a storage means for storing base reference data in respect of the spatial orientation of the second surface relative to said first surface; and a processing means comprising microprocessor circuitry interfaced with the scanning means and the storage means for processing said point cloud data and said base reference data to determine the relative displacement of said first surface with respect to said second surface, wherein said processing means includes:

a referencing means to orientate said point cloud data relative to key reference data of the base reference and to transform said point cloud co-ordinate system of the point cloud data into said structure co-ordinate system coinciding with said base reference data of said second surface, wherein said key reference data are critical parameters that describe the geometry of the base reference and boundaries of the first surface, a displacement processing means to calculate the displacement between said first surface and said second surface using both sets of data in said co-ordinate system, wherein said calculated displacement is compared against a prescribed threshold comprising a critical distance between said first surface and said second surface in order to gauge wear of said first surface relative to said second surface;

wherein said second surface is the inner surface of a cylindrical shell with opposing ends and said critical parameters include:
 the location of the central longitudinal axis of the shell;
 the radius of the shell; and
 the length of the cylindrical portion of the shell;

wherein the first surface comprises segments and said critical parameters further include the distance of the corner points of each said segment to one end of said shell;

wherein said processing means further includes a partitioning means for partitioning said point cloud data into discrete segments corresponding to different geometrically described sections of said first surface before operation of said referencing means and said displacement processing means;

wherein said referencing means includes a positioning means for positioning the point cloud data segments that were discretely partitioned and stored for the opposing ends of the cylindrical shell, relative to said base reference, wherein said positioning means enables:
 extracting data pertaining to the distance of the corner points from said point cloud data to determine the location of the corner points (A), the length of the segments (B), the gap between an adjacent segment and the one opposing end of the shell (C), and the longitudinal extent of the shell (D); and
 translating the data along the longitudinal axis by:
  determining the location of all corners within one vertical plane of visible segments all around the shell;
  determining the location of gaps between all corners opposing the determined location of all corners within one vertical plane of visible segments all around the shell;
  determining the halfway plane between planes through points extracted from the determined location of all corners and the determined location of gaps between all corners;
  determining the position of the base reference at the one opposing end according to a formula: $\frac{1}{2}A+B+C$; and
  determining the position of the base reference at the other opposing end by adding D to the outcome of the formula for determining the position of the base reference.

* * * * *